US010565394B2

(12) United States Patent
Kaliski, Jr.

(10) Patent No.: US 10,565,394 B2
(45) Date of Patent: Feb. 18, 2020

(54) PRIVACY—PRESERVING DATA QUERYING WITH AUTHENTICATED DENIAL OF EXISTENCE

(71) Applicant: VERISIGN, INC., Reston, VA (US)

(72) Inventor: Burton S. Kaliski, Jr., McLean, VA (US)

(73) Assignee: VERISIGN, INC., Reston, VA (US)

(*) Notice: Subject to any disclaimer, the term of this patent is extended or adjusted under 35 U.S.C. 154(b) by 715 days.

(21) Appl. No.: 15/271,192

(22) Filed: Sep. 20, 2016

(65) Prior Publication Data

US 2017/0262651 A1     Sep. 14, 2017

Related U.S. Application Data

(63) Continuation-in-part of application No. 15/173,608, filed on Jun. 3, 2016, now Pat. No. 9,866,536, which
(Continued)

(51) Int. Cl.
*G06F 17/30*     (2006.01)
*G06F 21/62*     (2013.01)
(Continued)

(52) U.S. Cl.
CPC ........ *G06F 21/6227* (2013.01); *G06F 16/245* (2019.01); *G06F 21/6254* (2013.01); *H04L 9/008* (2013.01)

(58) Field of Classification Search
None
See application file for complete search history.

(56) References Cited

U.S. PATENT DOCUMENTS 6,625,594 B1 *   9/2003   Rolland ................. H04L 29/06
6,745,248 B1     6/2004   Gardos et al.
(Continued)

FOREIGN PATENT DOCUMENTS

JP    2005167967 A    6/2005
WO   1999009726 A1    2/1999
WO   2001022286 A1    3/2001

OTHER PUBLICATIONS

"RSA Tokenization Server", RSA, The Security Division of EMC, 2 pages. http://fwww.rsa.com/services/pdfs/10160_TOKEN_DS_0410.pdf, accessed Dec. 2, 2011.
(Continued)

*Primary Examiner* — Hung D Le
(74) *Attorney, Agent, or Firm* — MH2 Technology Law Group, LLP

(57) ABSTRACT

In one embodiment, a tokenized list holder enables privacy-preserving querying with denial of existence functionality. Both an information requester and the tokenized list holder access related (or identical) tokenizing algorithms to generate tokenized terms based on original terms. Prior to receiving a query for information based on a tokenized query term, the tokenized list holder generates sorted tokenized data terms that are associated with a database. Upon receiving the query, the tokenized list holder determines that the tokenized query term is not included in the sorted tokenized data terms. The tokenized list holder then generates a signed response that specifies a gap in the sorted tokenized data terms to indicate that the information is not included in the database. Advantageously, because neither the query nor the response includes original (i.e., untokenized) terms, the privacy of both the information requester and the database is preserved.

16 Claims, 14 Drawing Sheets

Related U.S. Application Data is a continuation of application No. 13/732,815, filed on Jan. 2, 2013, now Pat. No. 9,363,288, which is a continuation-in-part of application No. 13/660,838, filed on Oct. 25, 2012, now Pat. No. 9,202,079.

(51) Int. Cl.
*H04L 9/00* (2006.01)
*G06F 16/245* (2019.01)

(56) References Cited

U.S. PATENT DOCUMENTS

| | | |
|---|---|---|
| 6,895,430 B1 | 5/2005 | Schneider |
| 6,901,436 B1 | 5/2005 | Schneider |
| 6,973,505 B1 | 12/2005 | Schneider |
| 7,188,138 B1 | 3/2007 | Schneider |
| 7,194,552 B1 | 3/2007 | Schneider |
| 7,409,406 B2 | 8/2008 | Agrawal et al. |
| 7,509,490 B1 | 3/2009 | Hsu et al. |
| 7,549,169 B1 | 6/2009 | Sobel et al. |
| 7,558,970 B2 | 7/2009 | Bellovin et al. |
| 7,565,402 B2 | 7/2009 | Schneider |
| 7,698,425 B2 | 4/2010 | Thayer et al. |
| 7,698,426 B2 | 4/2010 | Thayer et al. |
| 7,707,039 B2 | 4/2010 | King et al. |
| 7,711,727 B2 | 5/2010 | Agrawal et al. |
| 7,742,953 B2 | 6/2010 | King et al. |
| 7,823,207 B2 | 10/2010 | Evenhaim |
| 7,979,711 B2 | 7/2011 | Chen et al. |
| 8,037,168 B2 | 10/2011 | Schneider |
| 8,117,339 B2 | 2/2012 | Adelman et al. |
| 8,140,502 B2 | 3/2012 | Francis et al. |
| 8,224,923 B2 | 7/2012 | Colosi |
| 8,224,994 B1 | 7/2012 | Schneider |
| RE43,690 E | 9/2012 | Schneider |
| 8,332,655 B2 | 12/2012 | Gupta |
| 8,380,720 B2 | 2/2013 | Chang et al. |
| 8,429,421 B2 | 4/2013 | Chase et al. |
| RE44,207 E | 5/2013 | Schneider |
| 8,458,161 B2 | 6/2013 | Schneider |
| 8,612,565 B2 | 12/2013 | Schneider |
| 8,635,340 B1 | 1/2014 | Schneider |
| 8,739,243 B1 | 5/2014 | Martini |
| 8,874,932 B2 | 10/2014 | Gupta |
| 8,909,760 B2 | 12/2014 | Holmes et al. |
| 9,275,040 B1 | 3/2016 | Bladel |
| 2004/0098485 A1* | 5/2004 | Larson .............. H04L 29/12066 709/227 |
| 2004/0199520 A1 | 10/2004 | Ruiz et al. |
| 2004/0199608 A1 | 10/2004 | Rechterman et al. |
| 2005/0005136 A1 | 1/2005 | Chen et al. |
| 2005/0055327 A1 | 3/2005 | Agrawal et al. |
| 2005/0125451 A1* | 6/2005 | Mooney ............... G06F 16/951 |
| 2005/0166046 A1 | 7/2005 | Bellovin et al. |
| 2005/0234921 A1 | 10/2005 | King et al. |
| 2005/0259817 A1 | 11/2005 | Ramzan et al. |
| 2005/0289084 A1 | 12/2005 | Thayer et al. |
| 2006/0168020 A1 | 7/2006 | Brennan, III |
| 2007/0118884 A1 | 5/2007 | Ozaki et al. |
| 2007/0208714 A1 | 9/2007 | Ture et al. |
| 2007/0282796 A1 | 12/2007 | Evenhaim |
| 2008/0016233 A1 | 1/2008 | Schneider |
| 2008/0034199 A1 | 2/2008 | Nair et al. |
| 2008/0059607 A1 | 3/2008 | Schneider |
| 2008/0059787 A1 | 3/2008 | Hohenberger et al. |
| 2008/0091997 A1 | 4/2008 | Osanai |
| 2008/0072039 A1 | 5/2008 | Relyea |
| 2008/0170701 A1 | 7/2008 | Matsuo et al. |
| 2008/0183703 A1 | 7/2008 | Agrawal et al. |
| 2008/0235507 A1 | 9/2008 | Ishikawa et al. |
| 2008/0270418 A1 | 10/2008 | Chen et al. |
| 2008/0313352 A1 | 12/2008 | Telesco |
| 2009/0041253 A1 | 2/2009 | Chen et al. |
| 2009/0222530 A1 | 9/2009 | Buford et al. |
| 2009/0327296 A1 | 12/2009 | Francis et al. |
| 2010/0058209 A1 | 3/2010 | Adelman |
| 2010/0106980 A1 | 4/2010 | Kerschbaum et al. |
| 2010/0114964 A1 | 5/2010 | Kerschbaum et al. |
| 2010/0119481 A1 | 5/2010 | Ruebsam et al. |
| 2010/0146299 A1 | 6/2010 | Swaminathan et al. |
| 2010/0153403 A1 | 6/2010 | Chang et al. |
| 2010/0153535 A1 | 6/2010 | Thayer et al. |
| 2010/0198846 A1 | 8/2010 | Gupta |
| 2010/0203960 A1 | 8/2010 | Wilson et al. |
| 2010/0223144 A1 | 9/2010 | Lee |
| 2010/0269174 A1 | 10/2010 | Shelest |
| 2010/0318546 A1 | 12/2010 | Kenthapadi et al. |
| 2010/0318782 A1 | 12/2010 | Auradkar et al. |
| 2010/0325128 A1 | 12/2010 | Adelman et al. |
| 2010/0325240 A1* | 12/2010 | Drako ................ H04L 61/1511 709/217 |
| 2010/0325253 A1 | 12/2010 | Adelman et al. |
| 2011/0055248 A1 | 3/2011 | Consuegra et al. |
| 2011/0055249 A1* | 3/2011 | Consuegra .............. G06F 21/33 707/769 |
| 2011/0055331 A1 | 3/2011 | Adelman et al. |
| 2011/0055552 A1 | 3/2011 | Francis et al. |
| 2011/0110525 A1 | 5/2011 | Gentry |
| 2011/0145580 A1 | 6/2011 | Auradkar et al. |
| 2011/0153867 A1* | 6/2011 | van de Ven ....... H04L 29/12811 709/245 |
| 2011/0296176 A1 | 12/2011 | Ashrafi |
| 2012/0030047 A1 | 2/2012 | Fuentes et al. |
| 2012/0036114 A1 | 2/2012 | Kim |
| 2012/0124084 A1* | 5/2012 | Zhu ..................... G06F 16/9032 707/769 |
| 2012/0159180 A1 | 6/2012 | Chase et al. |
| 2012/0265892 A1 | 10/2012 | Ma et al. |
| 2012/0275597 A1 | 11/2012 | Knox et al. |
| 2012/0330902 A1 | 12/2012 | Gupta |
| 2013/0080767 A1 | 3/2013 | Francis et al. |
| 2013/0085932 A1 | 4/2013 | Waldron et al. |
| 2013/0104229 A1 | 4/2013 | Brennan, III |
| 2013/0173917 A1 | 7/2013 | Clifton et al. |
| 2013/0191650 A1 | 7/2013 | Balakrishnan et al. |
| 2013/0212388 A1 | 8/2013 | D'Souza et al. |
| 2013/0238646 A1 | 9/2013 | Maro |
| 2013/0262852 A1 | 10/2013 | Roeder et al. |
| 2013/0339751 A1 | 12/2013 | Sun et al. |
| 2014/0052984 A1 | 2/2014 | Gupta |

OTHER PUBLICATIONS

"Tokenization (data security)," Wikipedia, the free encyclopedia, http://en.wikipedia.org/w/index.php?title=Tokenization_(data_security)&oldid=517346331, Retrieved on Mar. 12, 2014, pp. 1-2.

"Trademark Clearinghouse: Draft Implementation Model", ICANN, Apr. 13, 2012, 46 pages.

Bellovin et al., "Privacy-Enhanced Searched Using Encrypted Bloom Filters", International Association for Cryptologic Research, vol. 20040201:185825, Feb. 1, 2004, pp. 1-12.

Boneh et al. "Conjunctive, Subset, and Range Queries on Encrypted Data," Theory of Cryptography, Lecture Notes in Computer Science 4392, Feb. 21, 2007, pp. 535-554.

Boyens et al., "Using Online Services in Untrusted Environments: A Privacy-Preserving Architecture", Proceedings of the European Conference on Information Systems, 2003, pp. 1-16.

Chang et al., "Privacy-Preserving Keyword Searched on Remote Encrypted Data", Applied Cryptology and Network Security, vol. 3531 of the series Lecture Notes in Computer Science, 2006, pp. 442-455.

De Cristofaro, et al., "Fast and Private Computation and Set Intersection Cardinality", IACR ePrint, Oct. 2, 2012, 14 pages.

Emiliano De Cristofaro, Paolo Gasti, and Gene Tsudik. Fast and Private Computation and Set Intersection Cardinality. IACR ePrint, updated Jul. 26, 2011.

Extended European Search Report for Application No. 13189842.1 dated Mar. 21, 2014.

Extended European Search Report for Application No. 13189843.9 dated Jan. 23, 2015.

(56) References Cited

OTHER PUBLICATIONS

Federrath et al., "Privacy-Preserving DNS: Analysis of Broadcast, Range Queries and Mixed-base Protection Methods", Computer Security—ESORICS 2011, Lecture Notes in Computer Science, vol. 6879, 2011, pp. 1-20.
Final Office Action for U.S. Appl. No. 13/660,838 dated Apr. 1, 2014.
Final Office Action for U.S. Appl. No. 13/660,838 dated Mar. 5, 2015.
Final Office Action U.S. Appl. No. 131732,815 dated Jan. 20, 2015.
Ford et al., "Server-Assisted Generation of a Strong Secret from a Password", In WETICE '00 Proceedings of the 9th IEEE International Workshops on Enabling Technologies: Infrastructure for Collaborative D Enterprises, IEEE, 2000, 5 pages.
Ha, "Facebook to Roll Out Email- and Phone Number-Based Ad Targeting Next Week", TechCrunch, Aug. 30, 2012, 2 pages.
Kim et al., "Private Top-k Aggregation Protocols", IACR ePrint, updated Oct. 24, 2012, 15 pages.
Kumar et al., "On Anonymizing Query Logs via Token-based Hashing", WWW 2007, May 8-12, 2007, pp. 629-638.
Liu et al., "An Efficient Privacy Preserving Keyword Search Scheme in Clouding Computing", 2009 International Conference on Computational Science and Engineering, 2009, pp. 715-720.
Non-Final Office Action dated Dec. 19, 2013, U.S. Appl. No. 13/660,838, 53 pages.
Non-Final Office Action dated Mar. 6, 2017, U.S. Appl. No. 15/173,608. 19 pages.
Non-Final Office Action for U.S. Appl. No. 13/660,838 dated Oct. 25, 2012.
Non-Final Office Action for U.S. Appl. No. 13/660,838 dated Nov. 20, 2014.
Non-Final Office Action for U.S. Appl. No. 13/732,815 dated Sep. 22, 2014.
Non-Final Office Action for U.S. Appl. No. 13/732,815 dated May 22, 2015.
Notice of Allowance and Fees Due dated Jul. 22, 2015, U.S. Appl. No. 13/660,838, pp. 1-21.
Partial European Search Report for Application No. 13189843.9 dated Mar. 21, 2014.
Zhao et al., "Analysis of Privacy Disclosure in DNS Query", International Conference on Multimedia and Ubiquitous Engineering {MUE'07), 2007, pp. 1-6.
PTO Non-Final Office Action dated May 15, 2018, U.S. Appl. No. 14/955,496, pp. 1-21.
Non-Final Office Action dated Aug. 22, 2017, U.S. Appl. No. 14/955,496, pp. 1-27.
Notice of Allowance dated Sep. 1, 2017, U.S. Appl. No. 15/173,608, pp. 1-36.
David Chaum et al., "Wallet Databases with Observers", Advances in Cryptology—CRYPTO '92, LNCS 740, 1993, pp. 89-105.
David Chaum, "Blind Signatures for Untraceable Payments", Advances in Cryptology, Proceedings of CRYPTO '82, 1983, pp. 199-203.
PTO Final Office Action dated Dec. 20, 2017, U.S. Appl. No. 14/955,496, pp. 1-32.
Final Office Action dated Mar. 29, 2017, U.S. Appl. No. 14/955,496, pp. 1-16.

* cited by examiner

PRIVACY—PRESERVING DATA QUERYING WITH AUTHENTICATED DENIAL OF EXISTENCE

CROSS-REFERENCE TO RELATED APPLICATIONS

This application is a continuation-in-part of the co-pending U.S. patent application titled, "Privacy Preserving Registry Browsing," filed on Jun. 3, 2016 and having application Ser. No. 15/173,608, which is a continuation of United States patent application titled, "Privacy Preserving Registry Browsing," filed on Jan. 2, 2013 and having application Ser. No. 13/732,815, now U.S. Pat. No. 9,363,288, which is a continuation-in-part of United States patent application titled, "Privacy Preserving Data Querying," filed on Oct. 25, 2012 and having application Ser. No. 13/660,838 now U.S. Pat. No. 9,202,079. The subject matter of these related applications is hereby incorporated herein by reference.

BACKGROUND OF THE INVENTION

Field of the Invention

Embodiments of the present invention relate generally to computer networks and, more specifically, to privacy-preserving data querying with authenticated denial of existence.

Description of the Related Art

With the advent of the "Internet of Things" (IoT), where any physical device with an Internet Protocol (IP) address can connect to the Internet, attempts to breach the security of data exchanged between IoT devices have increased in number and sophistication. Accordingly, numerous techniques that enhance the security of data exchanges between machines over the Internet have also been developed. One notable set of techniques involves Domain Name System Security Extensions (DNSSEC), which provide ways to encrypt and authenticate Domain Name System (DNS) data when exchanged between machines over the Internet.

As is well-known, the DNS translates human-readable domain names into the Internet Protocol (IP) numbers needed to establish TCP/IP (Transmission Control Protocol/Internet Protocol) communications over the Internet. One commonly performed DNS-based activity is querying the name servers that manage Internet domain names to determine whether a particular a domain name exists. When responding to such a query, if the domain name exists, then a DNSSEC-enabled name server provides a resource record signature (RRSIG) DNS record to indicate that the domain name exists. The RRSIG DNS record includes a verifiable digital signature that provides assurance as to the authenticity of the response. However, If the DNS record does not exist, then the DNSSEC-enabled name server provides an "authenticated denial of existence" DNS record to indicate that the DNS record does not exist. The authenticated denial of existence DNS record shows that the domain name does not exist by specifying the "gap" within the listing of existing domain names where the domain name in question should appear if that domain name did, in fact, exist. In a similar manner to the RRSIG DNS record, the authenticated denial of existence DNS record includes a verifiable digital signature that provides assurance as to the authenticity of the response.

One drawback to the above approach is that specifying the gap in the listing of existing domain names requires that a listing of existing domain names be provided. Transmitting such a listing between machines can compromise the privacy of a domain name database for the Internet. Therefore, advanced extensions to DNSSEC (e.g., NSEC3, NSEC5, etc.) have been developed that can be used to enhance the privacy of authenticated denial of existence transmissions.

However, while DNSSEC ensures that responses received from name servers are authentic and improves the privacy of the database of existing domain names, DNSSEC does not necessarily address the privacy concerns of information requesters. For instance, to determine whether a domain name exists, an information requester must provide that domain name to the name server. However, an information requester may not want to disclose the domain name for a variety of reasons. For example, as part of selecting a product name for a soon-to-be-launched product, a vendor could query a name server multiple times to determine whether various candidate domain names related to potential product names exist. Because the candidate domain names are disclosed as part of those domain name queries, information about the product could be inferred and prematurely leaked by a third party who intercepts the queries, which could negatively impact the vendor.

Similar security concerns apply to data queries involving non-DNS-related data as well. As a general matter, conventional data querying techniques that require some level of verification that data does not exist in a database or in databases do not provide mechanisms for ensuring the privacy of data requesters.

As the foregoing illustrates, what is needed in the art are more effective techniques for preserving privacy when querying databases about information contained in those databases.

SUMMARY OF THE INVENTION

One embodiment of the present invention sets forth a computer-readable storage medium that includes instructions that, when executed by a processor, cause the processor to perform steps that include generating sorted tokenized data terms that are associated with a database and based on a first tokenizing algorithm and a sorting order; receiving a query for information that includes a tokenized query term derived using the first tokenizing algorithm or a related second tokenizing algorithm; determining that the information is not included in the database based on the sorted tokenized data terms; and in response, generating a signed response that specifies a gap in the sorted tokenized data terms to indicate that the information is not included in the database.

Another embodiment of the present invention sets forth a method for querying a database. The method includes determining a tokenized query term based on a query term and a first tokenizing algorithm; transmitting a request for information to a tokenized list holder that includes the tokenized query term, where the tokenized list holder has access to the database and tokenized data terms that are associated with the database; and receiving a signed response from the tokenized list holder that specifies a gap in the tokenized data terms where the tokenized query term should be listed based on a predetermined sort order.

Another embodiment of the present invention sets forth a computer-readable storage medium that includes instructions that, when executed by a processor, cause the processor to perform steps that include applying a blinding algorithm to a query term or a data term to generate a blinded term; transmitting the blinded term to a tokenizing authority that implements at least a portion of a tokenizing algorithm; in response, receiving one or more blinded partial responses; computing a blinded challenge based on the one or more blinded partial responses; transmitting the blinded challenge to the tokenizing authority; in response, receiving one or more blinded final responses; computing a tokenized term based on the one or more blinded final responses; and generating or responding to a query based on the tokenized term.

One advantage of the disclosed techniques is that information requesters that require some level of verification that data does not exist in a database may query the database without disclosing query terms. In particular, because the information requester and the tokenized list holder both implement related (or identical) tokenizing algorithms, the information requester and the tokenized list holder may effectively interact during the querying process based on tokenized query terms and tokenized data terms. Further, the blinding algorithm enables the information requester and/or the tokenized list holder to interact with the tokenizing authority without disclosing, respectively, query terms and/or data terms.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
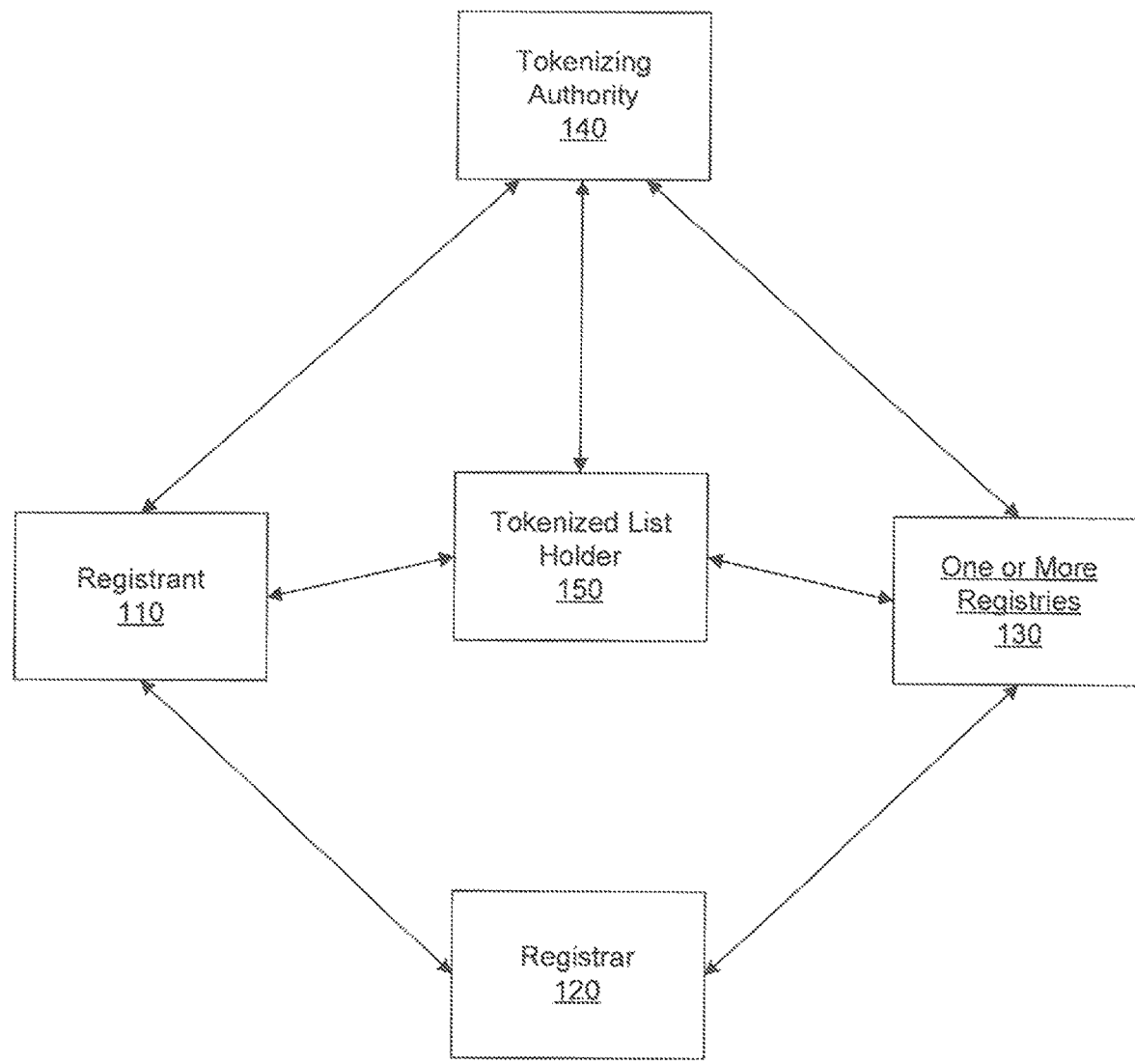
FIG. 1 illustrates an exemplary data flow and relationship between entities involved in a domain registration transaction, according to various embodiments of the present invention.

Reference will now be made in detail to the example implementations. Where possible, the same reference numbers may be used throughout the drawings to refer to the same or like parts.

In a typical domain name registration example, a registrant may want to reserve the domain name "ExampleName.com." To do so, the registrant would contact a registrar with a business relationship with the registry operating the .COM TLD. The registrant would query the registrar about the availability of the domain name "ExampleName" in the ".COM" namespace. If the "ExampleName.com" domain name were unavailable for the .COM TLD, the registrar may suggest alternative domain names at other TLDs or at the .COM TLD with names similar to "ExampleName," e.g., ExampleNameOnline.com, ExampleNameWeb.net, myExampleName.org, etc.

Under the known registration process above, when a user as a potential registrant submits a domain name to a registrar to determine availability of the domain name, the user must disclose information, including the desired domain name, which the user may consider to be confidential, private, or sensitive. At the least, this disclosure would entrust the registrar with the knowledge that the user has an interest in the domain name or possible variants. Implicitly, the user is also entrusting at least one registry for the TLD of interest with this information, as well. In many cases, the registrar will share the domain name with other registries to determine availability of the domain name with other TLDs. Further, if any of these availability queries are transmitted or received over an unencrypted transmission channel, then there is a risk of this information being distributed to unintended parties. Further still, if the query is logged, that information is subject to discovery through security breaches, court orders, or other means.

There may be several reasons why a user would want to keep domain query information private. For example, the user may not want the registrar to collect data on the user's searches because that data could be used in an anticompetitive way, unknowingly shared to others to some degree, used to profile the user's interests, or used to provide unwanted marketing materials. Also, some registrars (or others that may come across the domain name query in the information chain) may put a temporary lock on the domain name so that it could not be registered through a competing registrar. This can create the possibility that others may register and hold the domain name temporarily to profiteer on the ingenuity of the user by offering to transfer registration for a fee in excess of normal registration fees. In another example, a scenario can be imagined where, in determining a product name for a secret soon-to-be-launched device, a vendor may be querying the availability of various potential product names to identify an accompanying website address for the new product. Such queries, if known, could be used to the disadvantage of the vendor, for instance by leaks about the pending product release. As another example, a potential registrant may be subject to a non-disclosure agreement which may conceivably be violated based on domain registration queries.

Implementations of the present teachings can incorporate an architecture for domain name registrations which introduces an intermediary entity referred to as a "tokenizing authority." The tokenizing authority hosts and employs a tokenization function to encode a list of domain names or other information for secure storage and lookup purposes. For example, a tokenizing authority may tokenize a list of all registered domain names for a particular TLD. The tokenizing authority may then receive a domain name query from a potential registrant or other user, service, or requester, tokenize the domain name using the same tokenization function, and compare the tokenized domain name with the list of already-existing tokenized registered domain names. If the tokenized domain name does not appear in the list of tokenized registered domain names, then that domain name can be designated or identified as being currently available to register. This approach shields the actual domain name requested by the user from becoming known to registrars and registries. In addition, the tokenizing authority can also generate a set of encryption key information to encrypt data that is associated with the tokenized domain name or other data objects. In implementations described herein, the set of encryption key information can include an encryption key which is seeded or generated based on the domain name or other requested data object. The domain name or other data object of interest can then be stored, queried, and maintained in a more secure manner than with conventional methods which establish and operate a domain name registry or other repository.

In implementations, the tokenized list may be maintained by a separate entity, or by the original registry associated with the TLD. In the latter case, the tokenizing authority may receive the registered domain names from the registry, tokenize each name, and return a list of tokenized domain names back to the registry, which may act as a tokenized list holder. In another implementation, only the second level name (e.g., "ExampleName" in "ExampleName.com") may be tokenized, and then compared to a list of tokenized registered domain names organized by TLD (or queried against a tokenized database of registered domain names from each TLD registry). This allows a registrar to respond with alternative available TLD options without knowing the second level domain name.

FIG. 1 illustrates an overall environment, system, data flow, and associated relationships between entities involved in a domain registration, according to implementations of the present teachings. As shown in FIG. 1, the system 100 may include one or more registrants 110, one or more registrars 120, one or more registries 130, at least one tokenizing authority 140, and at least one tokenized list holder 150. Although not shown, system 100 may also include one or more networks that allow the one or more registrants 110, one or more registrars 120, one or more registries 130, at least one tokenizing authority 140, and at least one tokenized list holder 150 to communicate with one another over any combination of wired and/or wireless networks, many of which are known in the art.

A registrant 110, as referred to herein, can be or include any entity or user seeking to register or prospectively register a domain name or other data object or asset. In cases, the registrant 110 can be an end user or entity seeking to establish and operate a web site or other network portal or resource, on their own behalf. In cases, the registrant 110 can also potentially be or include other parties or entities, such as an automated service or application which is programmed to seek registration of a domain name based on various conditions. The registrant 110 may seek to register or prospectively register a domain name using, for example, a computing device. The computing device used by registrant 110 may include one or more processors, one or more memory units, a network interface that enables registrant 110 to communicate with registrar 120, registries 130, tokenizing authority 140, and/or tokenized list holder 150 over any combination of a wired and/or wireless network.

As noted, while the registrant 110 can be an end user of the domain, in some cases, the registrant 110 may also seek to resell the domain to another registrant 110 in a domain transfer transaction. In other cases, the registrant 110 may retain ownership of the domain but license a third party use it, as when the registrant 110 is a web hosting provider and the third party is a customer of the registrant 110. Moreover, in still other cases, the registrant 110 may not intend to use a domain in a traditional fashion. For example, some registrants 110 may seek to reserve domain names which they perceive to be desirable such that they can sell those domain names for a profit. Other registrants 110 may reserve a name which is a slight variation of an existing and popular website, hoping to receive Internet traffic from people mistyping the URL of the popular website. Still other registrants may be computers performing an algorithm to automatically find and register domain names. Some registrants 110 will find further alternative ways, in addition to those described above, to use the domain name system, other than for the traditional use of hosting websites associated with the domain name that directs a user to a website. In general, however, the purposes for which registration is pursued do not affect the various security and other mechanisms described herein.

A registrant 110 may have an interest in preserving the privacy of their domain name availability queries. Thus, rather than perform a typical domain name availability request, the registrant 110 may use a service consistent with this disclosure to perform the domain name availability request, and receive an answer regarding the availability of the desired domain name. In implementations, a registrant 110 may simply be considered a user requesting information about a domain name in the broadest sense. Such information may include, but not be limited to, domain name availability, domain name record information, registrant information, WHOIS information, domain name creation and expiration dates, domain name registry lock status, name server information, and the like. Specific examples of such implementations will be described in further detail below.

The registrant 110 typically reserves a domain name from a registrar 120. Thus, the registrant's 110 relationship is primarily with the registrar 120. The registrar 120, however, may maintain a relationship with one or more registries 130 that control the TLD for which registration is desired. Typically, large registrars 120 will have relationships with many registries 130 to assure they can provide registrants 110 with many TLD domain options when reserving the requested or desired domains. The abstraction between the one or more registries 130 and registrant 110 may be convenient to the registrant 110 because the registrant 110 can register all or most of its domain names from one registrar 120, rather than requiring relationships or interactions with multiple registries 130 within the set of one or more registries 130.

The one or more registries 130 control the assignment of domain names. Each registry 130 in the set of one or more registries 130 is responsible for assuring the accuracy of the domain registration information it maintains. Further, each registry 130 is responsible for resolving requests for the domain names for the TLD over the DNS protocol. For example, the registry 130 that manages the .ORG TLD must provide, or otherwise make available, a DNS server containing nameserver information for a domain name registered through that registry 130, so that when a website is requested via the domain name in a URL, the proper nameserver will eventually respond to the request. To do so, the subject registry 130 directs the requester 110 to the nameserver designated as responsible to respond for the website's domain names. The registrar 120 and one or more registries 130 can each comprise one or more servers, other computers, applications, logic, and/or services to implement the functions described herein.

It should be understood that the registrant 110, registrar 120, one or more registries 130, and any combinations thereof may be owned, maintained, or operated by the same entity. It should also be understood that a registrant 110 can at times act like a registrar 120 by reserving and distributing domain names through a domain transfer mechanism, for instance via reselling or auction activity.

In implementations as shown, a tokenizing authority 140 may interact with each of the registrant 110, registrar 120, or one or more registries 130 through a privacy preserved domain availability request transaction (or "lookup"). The tokenizing authority 140 may provide tokenized domain names, domain name parts, and/or other information that may be derived or generated using one or more tokenizing algorithms. In implementations, one-way tokenizing algorithms may be used. Such algorithms receive a string of characters as an input, and return a tokenized string of characters based on the tokenizing algorithm(s). The algorithm(s) may be modified, reseeded, or substituted as needed to help protect against reverse engineering and the unauthorized decrypting of tokenized strings.

In implementations, the tokenizing authority 140 can be a direct responder to a privacy protected domain name lookup request. The tokenizing authority 140 can, in implementations, for instance be hosted in a tokenizing authority server, and/or in a network-based application or service, including a cloud-based application or service. Such would be the case where the tokenizing authority 140 maintains a list of tokenized registered domain names, and responds to queries against that list. In some implementations, the tokenizing authority 140 may be implemented or hosted by either the registrar 120 or the one or more registries 130, and may share hardware resources to implement the tokenizing functionality. In particular, this may be the case in implementations where a blinding or other pre-processing function is used to keep the domain name private from the tokenizing authority 140, as discussed further below.

A tokenized list holder 150 may store a list of tokenized domain names and other information. The tokenized list holder 150 may store information related to the tokenized domain names, or other registered lists, in a whole or partially encrypted form. The tokenized list holder 150 may receive a tokenized string from a potential registrant 110 (or domain related information requester), compare the tokenized string to its list of tokenized strings, and return an indication whether the tokenized string was found in the list of pre-existing stored tokenized strings. In addition, the tokenized list holder 150 may receive a tokenized string from a potential registrant 110 (or domain related information requester) and provide information related to the tokenized string. Some or all of the data may be encrypted with one or more encryption keys which are seeded, encoded, and/or otherwise generated based on the subject domain name, itself. The tokenized list holder 150 may be an entity related to, or hosted by, the tokenizing authority 140.

The tokenizing authority 140 and tokenized list holder 150 may be implemented in software as software modules or programs that may be stored on one or more local or remote computing systems. For example, the functionality of the tokenizing authority 140 and tokenized list holder 150 may each comprise one or more applications, including computer-readable instructions which, when executed by a processor, cause one or more computers to perform steps of a method. In implementations, the architecture illustrated in FIG. 1 may support execution of program code on one or more computers to accomplish the overall system and method. Computer-readable instructions may be stored on a computer-readable medium, without limitation such as a memory or disk. Such media typically provide non-transitory storage. One or more of the components depicted in FIG. 1 may be hardware components or combinations of hardware, software, operating system and other resources, such as, for example, special purpose computers or general purpose computers. In implementations, one or more of the components shown in FIG. 1 can also or instead be implemented in the form of physical or virtual network-based software or services. Any one or more of those components can for instance be hosted or implemented using cloud-based networks.

A computer or computer system, such as those that may comprise any of the components illustrated in FIG. 1, may also include internal or external databases. The database may comprise one or more individual databases or databases configured to act together. The database may be implemented in a commercial, open source, or proprietary database program or may be contained in log files, flat files, or any other data storage mechanism. The database may alternatively be referred to as a data store, store, or storage. The components of a computer or computer system may, among other things, connect through a local bus interface or over a local or wide area network, either individually or any combination thereof. The components depicted in FIG. 1 may be operatively connected to one another via a network, not shown, such as the Internet, an intranet, or any type of wired or wireless communication system. Connections may be implemented through a direct communication link, a local area network (LAN), a wide area network (WAN) and/or other suitable connections. In implementations, some or all of the entities and resources shown in FIG. 1 can also be implemented in a cloud-based network, or other distributed platform, network, service, or system.

Figure 2:
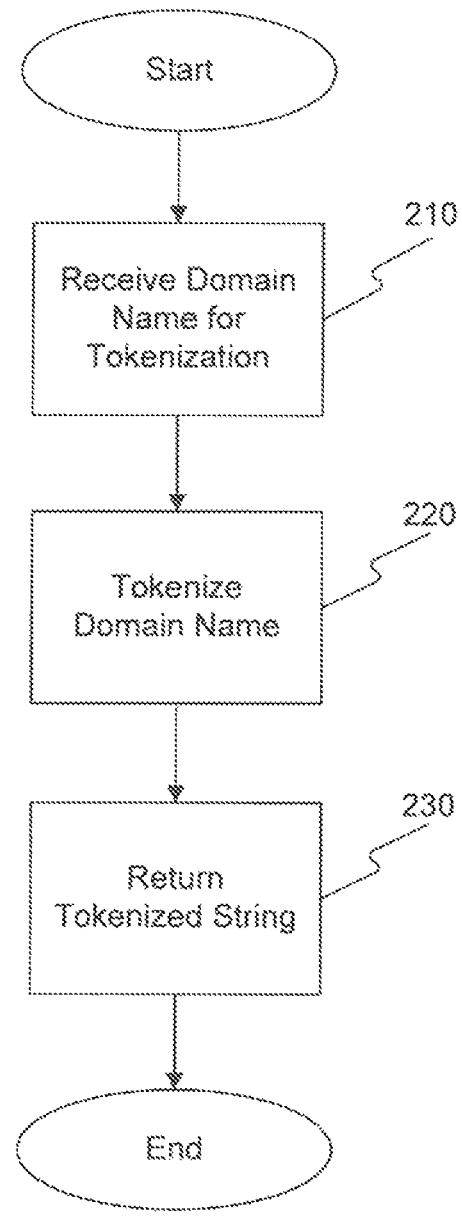
FIG. 2 illustrates an example process executed by a tokenizing authority to tokenize a domain name.

FIG. 2 illustrates an example process 200 executed by a tokenizing authority 140 to tokenize a domain name. The process 200 can be executed by the tokenizing authority 140 in the context of tokenizing both a domain name availability query and domain names that have already been registered. For example, the process 200 can be executed by the tokenizing authority 140 upon receiving a domain name availability query from a potential registrant 110. In step 210, the tokenizing authority 140 can receive the domain name for tokenization. In the case where the tokenizing authority 140 provides a tokenized version of a domain name for a potential registrant 110, the domain name may typically be received directly from the potential registrant 110. In the case where the tokenizing authority 140 provides a tokenized version of the domain name that has already been registered, the domain name may be received from the one or more registries 130, or from a third party offering tokenization registration services in cooperation with a registry 130. The third party could be a registrar 120, or another party providing registration support for privacy preserving domain name lookups. In either case, in some embodiments, the tokenizing authority 140 may be configured to receive multiple domain names at once through batch processing.

In step 220, the tokenizing authority 140 can tokenize the domain name. In tokenizing the domain name, the tokenizing authority 140 may optionally run a separation algorithm on the domain name to split the domain name into two or more distinct segments or pieces, and tokenize those pieces independently. For example, the domain name "ExampleName.com" could be split into two strings "ExampleName" and "com." Each of these strings in turn may be tokenized separately. Thus, the information being tokenized can either be a fully qualified domain name (FQDN) such as "ExampleName.com" or a portion of a FQDN such as a label "ExampleName" or some other portion such as "Example". (In this example, only two levels of labels are given, but in longer domain names, third, fourth or other levels, or multiple levels, or other portions, could be tokenized, and searched in a repository of information of the appropriate type. If only the second-level label, i.e., "Example" is tokenized and searched, then the appropriate repository may be one in which the first-level label, i.e., "com", is a known and agreed value.) With separate tokenization strings, in the event that the desired domain name is unavailable for registration, the one or more registries 130 may be able to suggest alternative names even though they may not know either the desired name or the pieces of the desired name. This will be explained in greater detail below. As another example, the domain name "ExampleBlaster.com" could be split into three strings, "Example," "Blaster," and "com." Alternatively, the TLD portion need not be tokenized at all. Thus, in this example the word "Example" and "Blaster" would be tokenized, but "com" would not. This would allow a registrar 120, the one or more registries 130, or tokenized list holder 150 to more easily provide at least alternative TLDs to the TLD specified in the privacy preserving domain name query.

In one implementation, an algorithm to develop variants may be run by the potential registrant 110 prior to submission to the tokenizing authority 140. For example, the one or more registries 130 may provide software or services to the potential registrant 110 to analyze the desired domain name and automatically develop variants. Such variants may be developed using any known or later-developed algorithms suited to producing variants. The variants may then be submitted to the tokenizing authority 140 together for tokenization.

In step 230, the tokenizing authority 140 returns the tokenized string or strings, including a separator between strings when, for example, a domain name was split before tokenization. If tokenizing multiple domain names in a batch process, the tokenizing authority 140 may preserve the order for the convenience of the potential registrant 110. In the case where the tokenized list holder 150 may also be the one or more registries 130, the tokenizing authority 140 may mix up the order so that the registry 130 could not associate the tokenized strings with their submitted untokenized counterparts, assuming the tokenized string in a subsequent lookup request is visible to the one or more registries 130.

Figure 3:
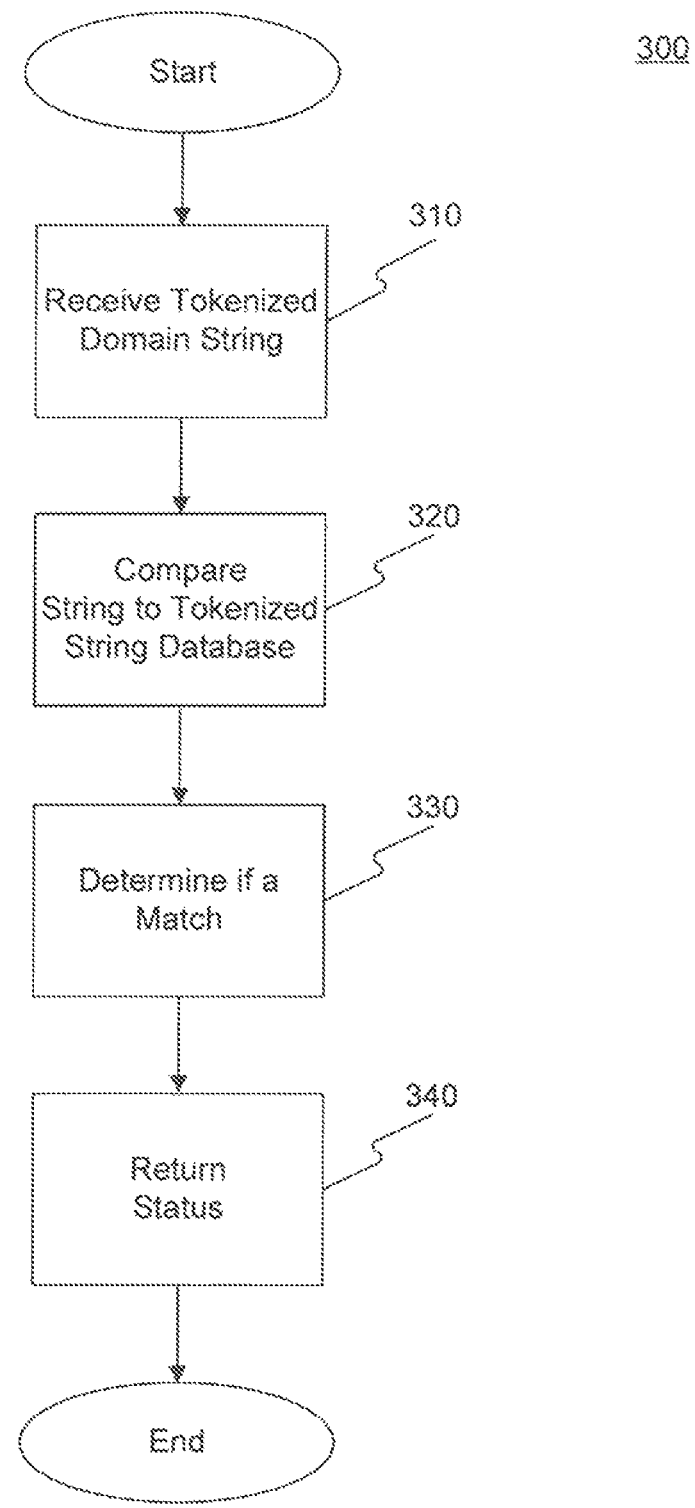
FIG. 3 illustrates an example process of determining whether a domain name has been registered while preserving privacy of the domain name query by using tokenized domain name strings, according to various embodiments of the present invention.

FIG. 3 illustrates an example process 300 of determining whether a domain name has been registered while preserving privacy of the domain name query by using tokenized domain name strings. A potential domain name registrant 110 can submit a tokenized domain name, such as, for example, the tokenized domain name received from step 230, to a tokenized list holder 150. The tokenized domain name may be submitted to the tokenized list holder 150 via an intermediary, such as a privacy preserving domain name supporting registrar 120, or submitted directly to the tokenized list holder 150. In step 310, the tokenized list holder 150 may receive the tokenized domain string (or strings if the tokenization process optionally developed variants by splitting or other means). In step 320, the tokenized list holder 150 may compare the tokenized domain string to the tokenized list. In step 330, the tokenized list holder 150 can determine whether a match occurs between the tokenized domain string and the tokenized list. If a match occurs, then the domain name is determined to be unavailable for registration because it already exists in the tokenized list. If no match occurs, then the domain name can be assumed to be available for registration. In step 340, the determination reached by the matching process is returned and passed along to the user. Thus, for example, in implementations where a requested domain name is not available for registration, that result can be transmitted to the potential registrant 110. In cases where a match occurs, for example, the information corresponding to the domain name may be returned, such information being optionally encrypted using one or more encryption keys based on the domain name, as further described herein.

The example process 300 preserves privacy of the domain name from the one or more registries 130, but still requires the tokenizing authority 140 to be trusted by the potential registrant 110. Even so, it significantly reduces the risk that the domain name of interest would be revealed to any registrar 120 or registry 130 in the domain lookup process.

Figure 4:
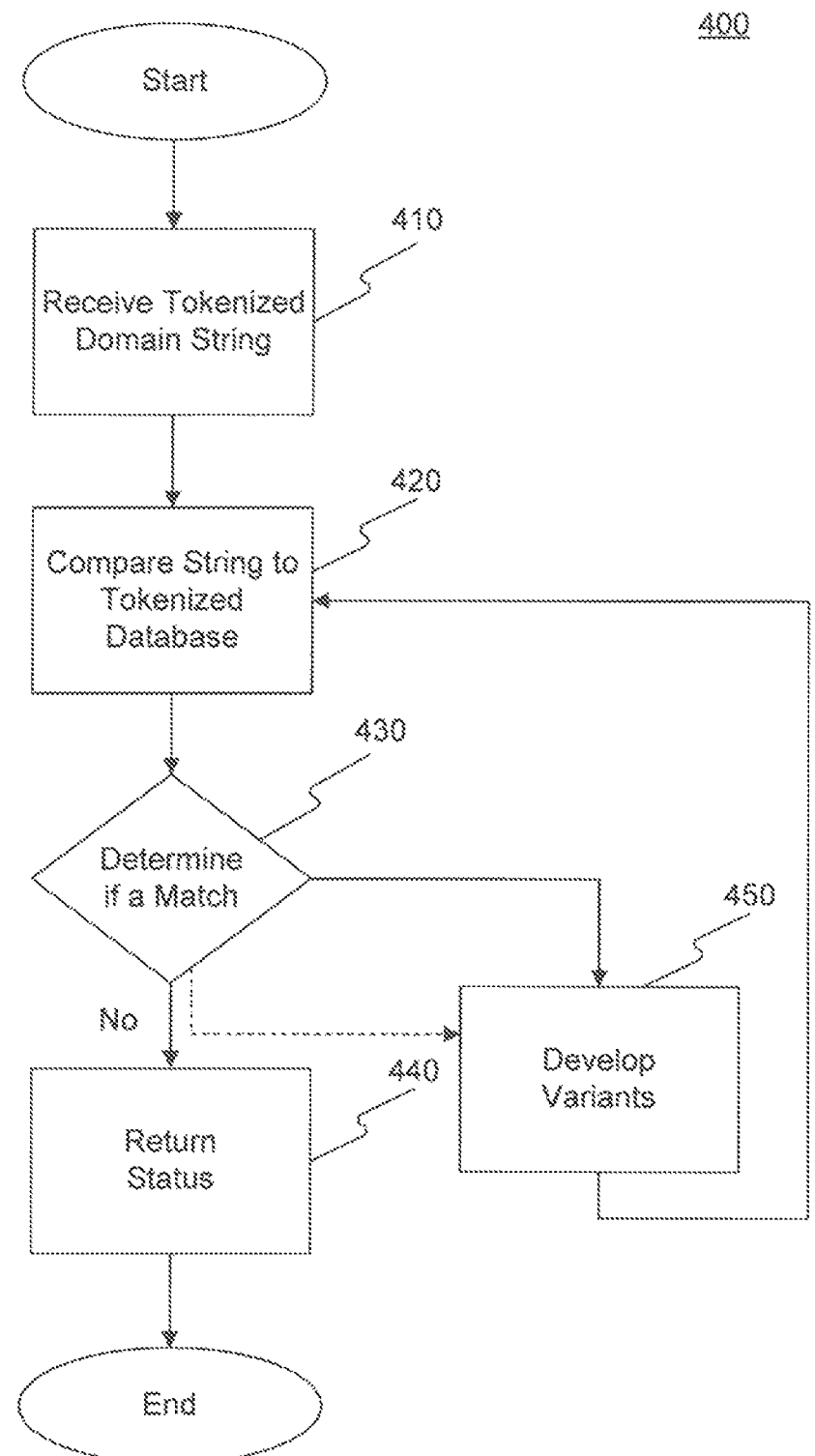
FIG. 4 illustrates an example process that uses tokenized domain names for domain name availability lookup, and includes techniques to suggest variants of the tokenized domain name submitted for lookup, according to various embodiments of the present invention.

FIG. 4 illustrates an example process 400 that uses tokenized domain names for domain name availability lookup, and includes techniques to suggest variants of the tokenized domain name submitted for lookup. In step 410, the tokenized domain string is received by, for example, the tokenized list holder 150. The tokenized domain string may consist of one or more tokenized strings in addition to the desired TLD in the clear. For example, if the desired domain name was "ExampleName.com," then the tokenized domain string may comprise "ExampleName" in the tokenized format and an indicator that "com" is the desired TLD. Where step 220, as discussed above, splits the domain name prior to tokenization, the tokenized domain string may comprise multiple singular tokenized strings in addition to the indicator of the desired TLD. For example, if the desired domain string was "ExampleBlaster.com," then the strings "Example" and "Blaster" may both be tokenized individually, and the request may include both strings, an indicator of the order of the preference of the strings, an indicator of any desired separation characters such as a dash ("-"), and an indicator of the desired TLD.

In step 420, the tokenized list holder 150 may compare the received tokenized string or strings to the tokenized domain name database. In the case of multiple strings, the tokenized domain name database may support comparing multiple strings to the list of tokenized registered domain names. In other words, the tokenizing authority 140 may return tokenized versions of domain names consistently when processing a domain name that may be split. The database maintained by the tokenized list holder 150 may contain multiple versions of the same domain name, to support options such as split string tokenization and whole string tokenization. For example, when the process 200 is executing step 220 for domain names that have already been registered, the tokenizing authority 140 may return multiple versions of the tokenized domain string format for a particular domain name, e.g., for the domain name "ExampleBlaster.com," the tokenizing authority 140 may return one result for the entire string "ExampleBlaster.com," one result for a non-TLD-specific split string "ExampleBlaster" and a "com" indicator, and one result for a completely split string "Example," "Blaster," and an indicator for "com." By storing multiple versions of the same domain string, the one or more registries 130 can support varying levels of privacy preservation for domain name lookups, where less domain name splitting is presumed to be more private.

In step 430 of the example process 400, the tokenized list holder 150 evaluates whether a match exists. If no match is found, the desired domain name can be assumed to be available for registration. The status may be returned in step 440. If a match is found, the desired domain name can be assumed to be unavailable for registration. In either case, variants of the desired domain name may optionally be developed in step 450, for instance using techniques described in reference to FIG. 5, below.

Figure 5:
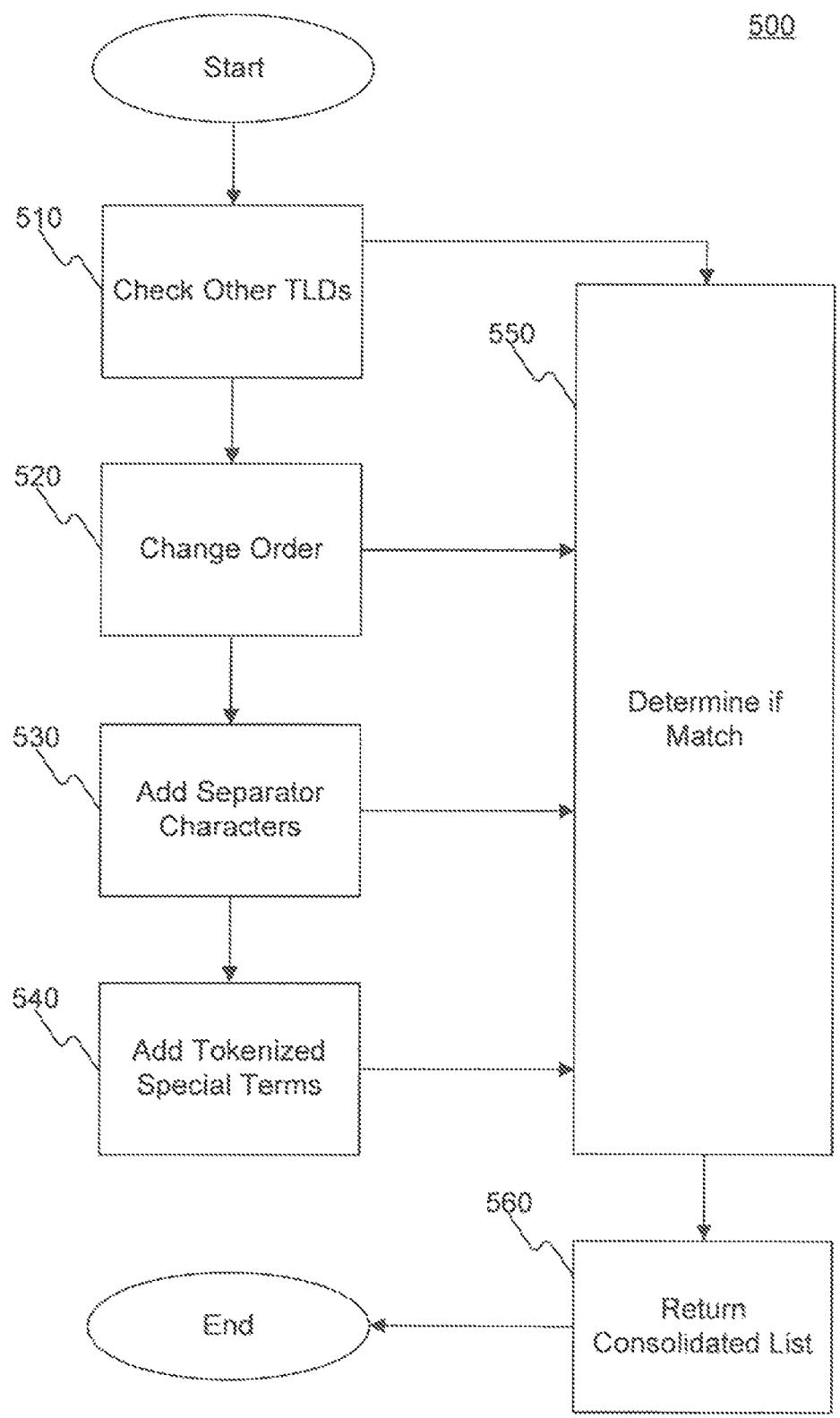
FIG. 5 illustrates an example process of developing variants for tokenized domain strings, according to various embodiments of the present invention.

FIG. 5 illustrates an example process 500 of developing variants for tokenized domain strings. While one process for developing variants is shown, it will be appreciated that any suitable technique for generating domain name or other variants can be used. Variants are desirable in the event that a requested domain name is unavailable, but the privacy preserving nature of the inventive process may complicate efforts to develop variants when the requested domain name is unknown due to tokenization. But because the tokenizing authority 140 may support domain splitting prior to tokenization, the tokenized elements may be combined to develop variants. Thus, for example, even where the second level name is left intact, by splitting the requested TLD, alternative TLDs may be suggested as variants. In step 510, the tokenizing authority 140 may check the tokenized first level string against other TLDs that have been configured to support the privacy preserving domain name lookup. For example, where "ExampleName.com" is unavailable, the tokenized string corresponding to "ExampleName" could be compared against tokenized strings for .NET and the like.

In step 520, where the domain name lookup request includes multiple tokenized strings, the tokenizing authority 140 may develop variants by mixing the order of the tokenized strings. For example, if the availability of the domain name "ExampleBlaster.com" is requested and "Example" and "Blaster" were tokenized separately, then a variant could include "BlasterExample.com."

In step 530, where the domain name lookup request includes multiple tokenized strings, the tokenizing authority 140 may develop variants by including separator characters between tokenized strings. For example, if the availability of the domain name "ExampleBlaster.com" is requested and "Example" and "Blaster" were tokenized separately then a variant may include "Example-Blaster.com." Presently, the only non-alphanumeric character allowed in a domain name is a dash ("-"), but other separator characters may include characters such as "e," "o," "i," and so forth. For example, another variant of "ExampleBlaster.com" could be "ExampleEBlaster.com." One skilled in the art will understand the separator characters may include a string of any number of characters. In the case where separator characters are not tokenized, however, for practical purposes, the number of available separator character strings will likely be a limited set of characters because the tokenized list holder 150 must hold all the variants of registered domain names in a tokenized or partially tokenized form.

In step 540, where the domain name lookup request has at least been split at the TLD level, the tokenizing authority 140 may develop variants by including Internet-centric terms at the beginning or end of the domain name. For example, if the availability of the domain name "Example.com" is requested and "Example" was tokenized independently of the ".com," then a variant could include "NetExample.com" or "ExampleNet.com." This non-limiting example is merely indicative of the types of Internet-centric terms that may be considered. Other terms may also be considered, such as terms relevant to current events and the like.

In the case where the tokenized list holder 150 is the same entity as or related to the one or more registries 130, the tokenized list holder 150 may store tokenized versions of these terms without knowing which terms correspond to which tokenized version. For example, the tokenized list holder 150 may create a list of such terms and send the list to the tokenizing authority 140 for tokenization. The tokenizing authority 140 may tokenize the list of terms and return them in a random order. In step 540, the tokenizing authority 140 can create variants by adding the terms to the tokenized domain string or strings either before or after a tokenized string. The tokenized list holder 150 can then check these against the tokenized list, and because the tokenizing authority 140 can provide multiple tokenization results for a single domain name by splitting the domain name, the tokenized list holder 150 may find a match if the variants had already been registered. Conversely, the tokenized list holder 150 may not find a match if the variants had not been registered.

As part of step 220 of FIG. 2, the tokenizing authority 140 may preserve the list of terms and use the terms to create split points at those term boundaries. For example, if "net" is a term that was stored by the privacy preserving registry in tokenized form in its list of add-on terms, then in tokenizing the domain name "NetExample.com," the tokenizing authority 140 may reference the list of add-on terms and create a split boundary after "net." Thus, the tokenizing authority 140 may return tokenized strings for "net" and "example" and an indicator for the .COM TLD.

In step 550, the tokenizing authority 140 may determine which of the variants match tokenized registered domains from the tokenized database. One skilled in the art should understand that the list of developed variants may include techniques applied from any combination of the steps 510, 520, 530, and 540, and that such steps can be performed in any order, repeated any number of times, and applied in multiple instances to create, for example, variants of variants. Depending on the number of variants that were determined as available, the process can go back and calculate additional variants to attempt to find any available variants, or the process 500 can proceed to step 560 and deliver a list of available variant domain names.

Similarly to the example process 400 of FIG. 4, in step 560 of FIG. 5, the tokenizing authority 140 may develop variants regardless of whether the desired domain name was determined as available. In any case, however, the results or status may be returned as in step 540, including any suggestions based on variants of the requested domain name.

As noted, it will be appreciated that other techniques and approaches for developing variants for the domain name substrings or other components can be used. Those other techniques can be or include, for instance, those shown in co-pending U.S. application Ser. No. 9/970,096, filed Oct. 2, 2001, entitled "Determining Alternative Textual Identifiers Such As For Registered Domain Names," assigned or under obligation to the same entity as this application, which co-pending application is incorporated by reference in its entirety herein. Those other techniques can likewise include, for further instance, those shown in co-pending U.S. application Ser. No. 13/249,429, filed Sep. 30, 2011, entitled "Domain Name Tokenization and Alternative Domain Name Generation," assigned or under obligation to the same entity as this application, which co-pending application is likewise incorporated by reference in its entirety herein.

As discussed above, the tokenizing authority 140 must be considered a trusted entity because the tokenizing authority 140 receives the domain names in the clear and provides tokenized string(s) in response. In other words, in a traditional domain name availability lookup, the desired domain name may be shared with a registrar 120, one or more registries 130, and anyone who happens to intercept the query. With the use of a trusted tokenizing authority 140, however, only the tokenizing authority 140 has access to the domain name of interest and the communication between the potential registrant 110 and the tokenizing authority 140 may be made over a secured interface.

In some implementations (and in variations on some of the above implementations), however, the tokenizing authority 140 may never learn the domain name. For instance, prior to sending the domain name to the tokenizing authority 140, the user or registrant 110 may preprocess the domain name by blinding it using an appropriate homomorphism function on the input space of the tokenizing function. The tokenizing authority 140 then applies the tokenizing function to the modified input, returning the result. Because the blinding function is a homomorphism relative to the tokenizing function, the inverse unblinding function may be applied to the result to obtain the tokenized version of the domain name that would have been obtained without blinding. A tokenized list of registered domain names may optionally be generated by the tokenizing authority 140, using a similar blinding technique involving homomorphic functions. The user may then use the tokenized domain name to query the tokenized list holder 150, and determine whether the domain name has been registered or whether the domain name has corresponding associated information. The optional use of a blinding function can preserve the privacy of the domain name, both from the perspective of the registrant 110 and of the one or more registries 130.

Figure 6:
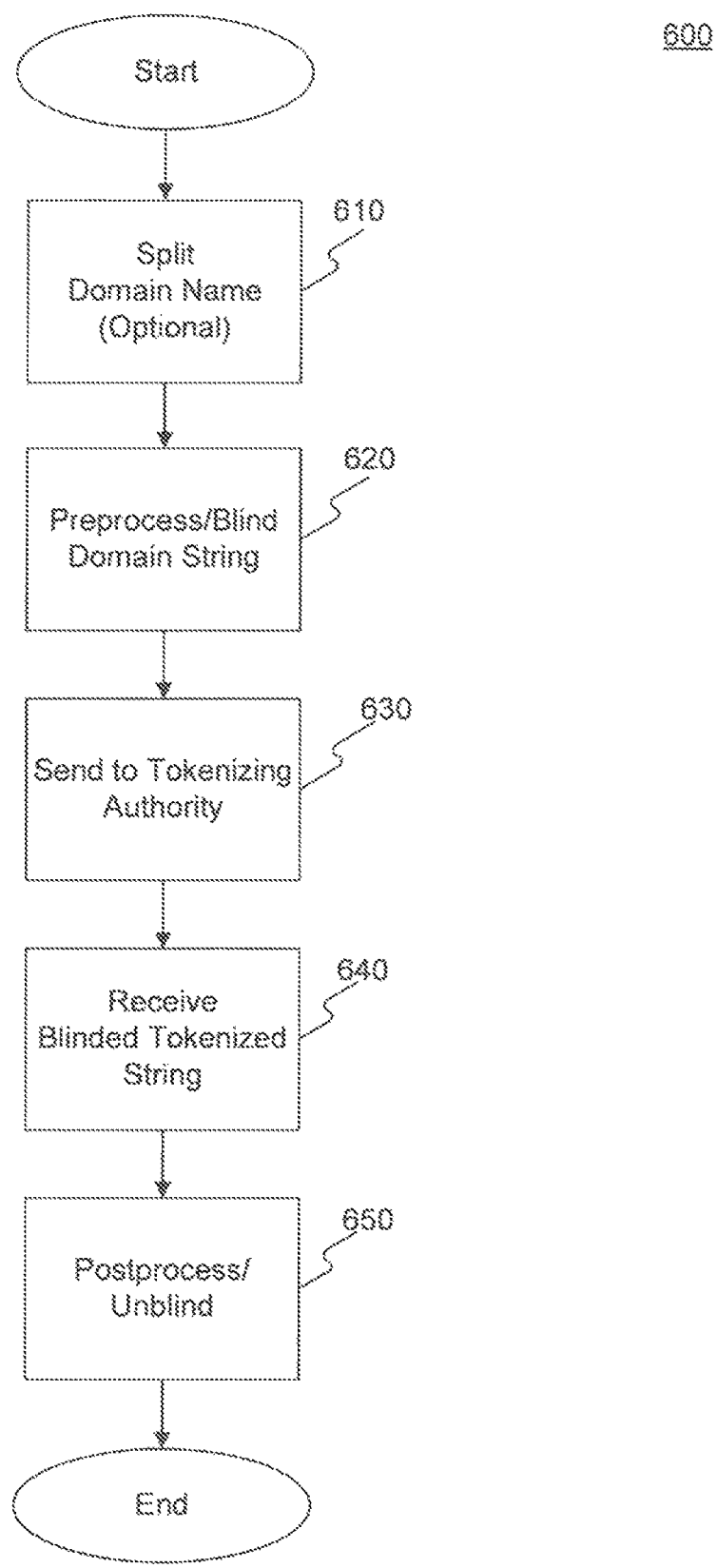
FIG. 6 illustrates an example process of performing a pre-processing blinding function on the domain name of interest from the perspective of a potential registrant, according to various embodiments of the present invention.

FIG. 6 illustrates an example process 600 for performing a blinding function on the domain name of interest from the perspective of the potential registrant 110 (or other user). In optional step 610, the potential registrant 110 may if desired split the domain name into pieces for tokenization, for instance according to the processes 400 and 500 described above. In step 620, the potential registrant 110 may preprocess the domain name input string or strings by applying a blinding function. The blinding function may be a homomorphism of the tokenizing function used by the tokenizing authority 140. That is, in some example implementations, the blinding function must be reversible after tokenization has occurred to reveal the tokenized domain name. The blinding function may be seeded with a random number to prevent the tokenizing authority 140 from reverse engineering the input domain name, which may thereby remain confidential.

In step 620, the blinded input string or strings representing the domain name of interest are sent to the tokenizing authority 140. Once the tokenizing authority 140 has tokenized the input string or strings, it may return the tokenized result to the potential registrant 110 or the one or more registries 130, as in step 640. In step 650, the potential registrant 110 or the one or more registries 130 reverses the blinding function by applying a (post-processing) unblinding function to find the tokenized string or strings. These tokenized string or strings may then be submitted to the domain list holder 150, either directly or through an intermediary. From the perspective of the tokenizing authority 140, tokenizing a blinded input string is similar to the process 200 described in FIG. 2, with the exception that, because the input string is blinded, the tokenizing authority 140 cannot perform domain name splitting itself. The tokenizing authority 140 may, however, support domain name splitting if the domain name is submitted in a split format with each of the pieces separately blinded.

As an example of a typical blind signature technique, a first party, Alice, obtains the signature of a second party, Bob, on a message m via the following or similar steps. Alice first computes a blinded version m' of the message m, and sends m' to Bob. Bob then computes a signature s' on the message m using Bob's signature function, and returns s' to Alice. Alice then unblinds s' to recover s, the actual signature on m. One example of such a technique involves the RSA signature scheme, where Bob's signature function is m'= (s')d mod n where (n,d) is Bob's RSA private key. Alice obtains Bob's RSA public key (n,e). An appropriate blinding function in this case is for Alice to compute m'=mre mod n where r is a random value between 0 and n−1. The signature s' can be unblinded by Alice by computing s=s' r−1 mod n. (The well-known proof that unblinding reverses blinding is given by expanding the formulas: s=s' r−1=(m')d r−1= (mre)d r−1=md red r−1=md mod n.)

A blinding technique based on the RSA signature scheme may be employed in implementations of the present teachings as follows. First, the potential registrant 110 or the one or more registries 130 can apply a cryptographic hash function to the domain name to map it to a message m between 0 and n−1. Second, the potential registrant 110 or one or more registries 130 blinds the message m, computing m' as above, and sends m' to the tokenizing authority 140.

Third, the tokenizing authority 140 computes the signature s' on the blinded input m', and return s' as the blinded output. Fourth, the potential registrant 110 or one or more registries 130 unblinds the blinded output s', obtaining the actual signatures as above. Fifth, the potential registrant 110 or one or more registries 130 applies a cryptographic hash function to the signature s (and possibly other inputs) to map it to a tokenized domain name. Thus, one implementation may have m=H1(domain name) where H1 is a first hash function, and tokenized domain name H2(s) where H2 is a second (optionally distinct) hash function.

In addition to mapping to an integer in the appropriate range, the first cryptographic hash function also helps ensure that non-matching domain names are unlikely to produce matching tokenized domain names due to "collisions" in the tokenization process, such as when two distinct inputs produce the same (or similar) output over the portion of the tokenized output used for comparison.

The second cryptographic hash function helps ensure that it is difficult for an intercepting party to determine whether a tokenized domain name corresponds to a given domain name without consulting the tokenizing authority 140 at some point.

It may be noted that because the RSA signature scheme is deterministic (same input m produces same output s), the tokenizing function defined here will also be deterministic. This feature ensures that matching domain names always produce matching tokenized domain names.

Other blinding techniques with similar properties to the RSA signature scheme, along with associated blinding and unblinding functions, may also be employed in the tokenization process within the scope of the present teachings. For instance, the RSA signature scheme as described above may be altered by employing a different, or, depending on the format of the domain name, no function in the cryptographic first step, and a different, or no, function in the cryptographic fifth step.

Finally, it may also be noted that for the purposes of the disclosure, it is not necessary that the tokenizing process be reversible. That is, even the tokenizing authority 140 need not be able to recover the domain name from the tokenized domain name. The tokenizing process only needs to be able to map domain names forward to tokenized domain names, which can then be compared while preserving the privacy of the domain names, themselves.

Optionally, the one or more registries 130 can operate in a similar fashion as the potential registrant 110, as far as using blinding functions on domain names to be tokenized. If domain name splitting is desired, similar to the domain name registrant, the one or more registries 130 can perform the splitting step. The tokenizing authority 140 can in such cases simply tokenize all the blinded split domain names, and return those to the one or more registries 130. The list of terms that can be used to create domain name variants as in step 540 may still be used in a similar way as if the domain name strings were not blinded.

In some implementations, other information may be obtained using similar processes as those described above. For example, as referenced in the descriptions of the implementations above, rather than a potential registrant 110 searching for an available domain name, a data-requesting user 110 could search for information related to a registered domain name, such as an IP address, yet keep the nature of the query private. In addition to a list of tokenized registered domain names, the tokenized list holder 150 may also maintain a corresponding set of encrypted data associated with the registered domain. Using similar techniques as described above (such as a one-way function with an optional blinding function), a user or the one or more registries 130 could obtain an encryption or decryption key by which to encrypt or decrypt encrypted data associated with a registered domain. For these implementations, the registrant 110 may be considered more broadly as a user searching for information about a domain name. Likewise, a registrar 120 or one or more registries 130 may both be considered as domain information holders with which the user (registrant 110) may interact to request information pertaining to a particular domain name, while preserving privacy of the request. In those types of implementations, the tokenizing authority 140 operates in substantially the same way as described above. In some implementations, the tokenizing authority 140 may operatively be or include the same entity as the registrar 120 or one or more registries 130, particularly when a blinding function is used to protect from disclosing the domain name to the tokenizing authority 140.

Figure 7:
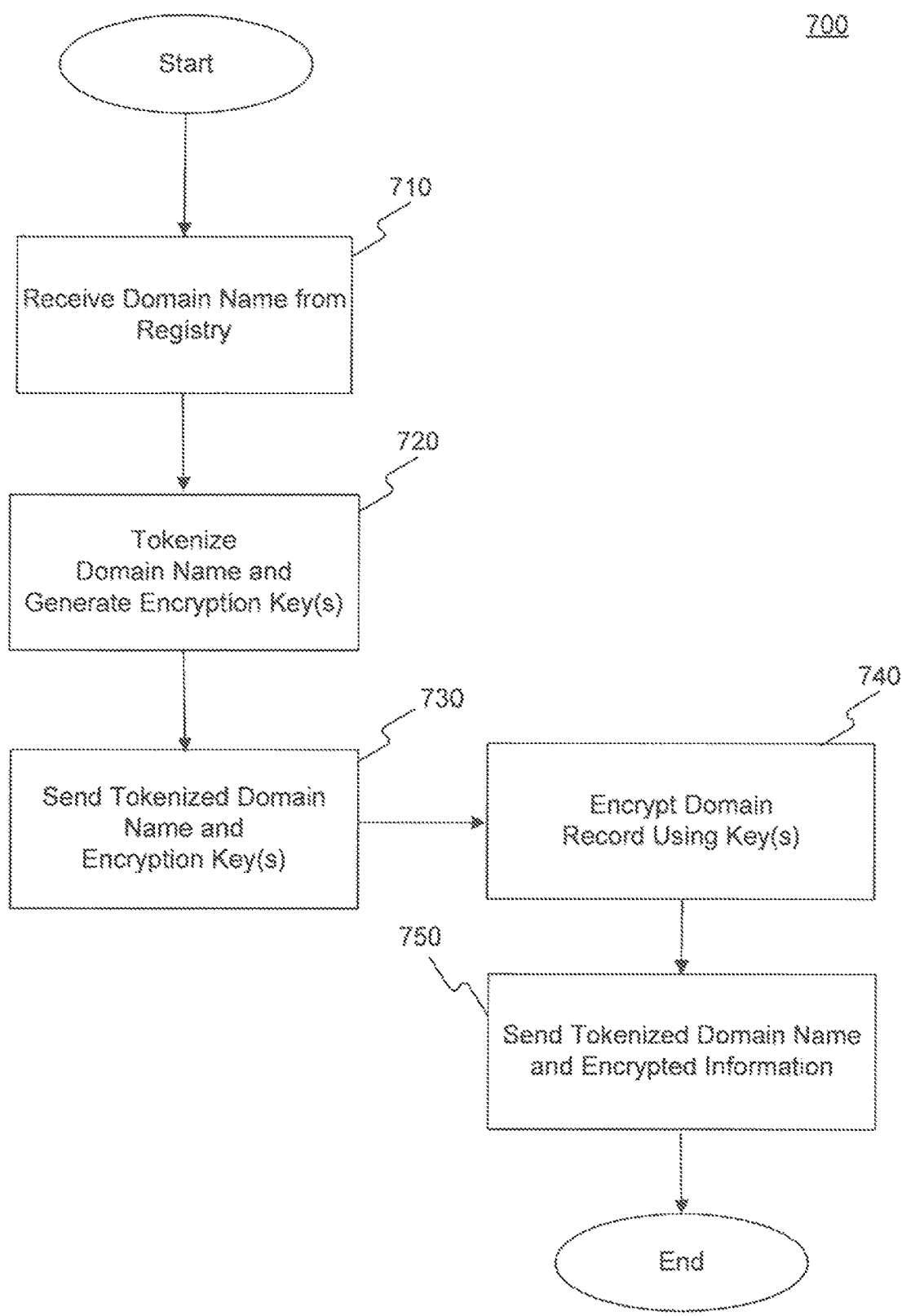
FIG. 7 illustrates an example process that receives a domain name and associated domain name information and processes the received data so that the domain name information can be made available in an encrypted format.

FIG. 7 illustrates an example process 700 that receives a domain name and information associated with or corresponding to the domain name, and processes the received data so that the domain name information may be made available in an encrypted format. Because of the encrypted format, users 110 are unable to recover the underlying information without first obtaining a corresponding decryption key. In step 710, the tokenizing authority 140 may receive a domain name from the domain name's registry 130 (or a registrar 120 should circumstances permit). The domain name is tokenized in step 720. It may be noted that because domain name variants would not generally be desired as described above, the tokenization process would not typically perform splitting on the domain name to generate multiple tokenized formats. However, splitting may still be done if domain name variants would be desired for some reason. Also in step 720, one or more encryption keys are generated from the domain name for use in optionally encrypting some or all of the domain name information. In step 730, the tokenized domain name and encryption key are returned to the one or more registries 130. In step 740, the one or more registries 130 may encrypt one or more parts of the related domain name information. In step 750, the one or more registries 130 may send the domain name information (encrypted or not) and the tokenized domain name to the tokenized list holder, e.g., tokenized list holder 150.

In alternative implementations, the tokenizing authority 140 can receive the domain name and the related information, generate the tokenized domain name and encryption key(s), use the key(s) to optionally encrypt all or some of the related domain information, and either return the tokenized domain name and optionally encrypted related information or send the tokenized domain name and optionally encrypted related information to the tokenized list holder 150.

Figure 8:
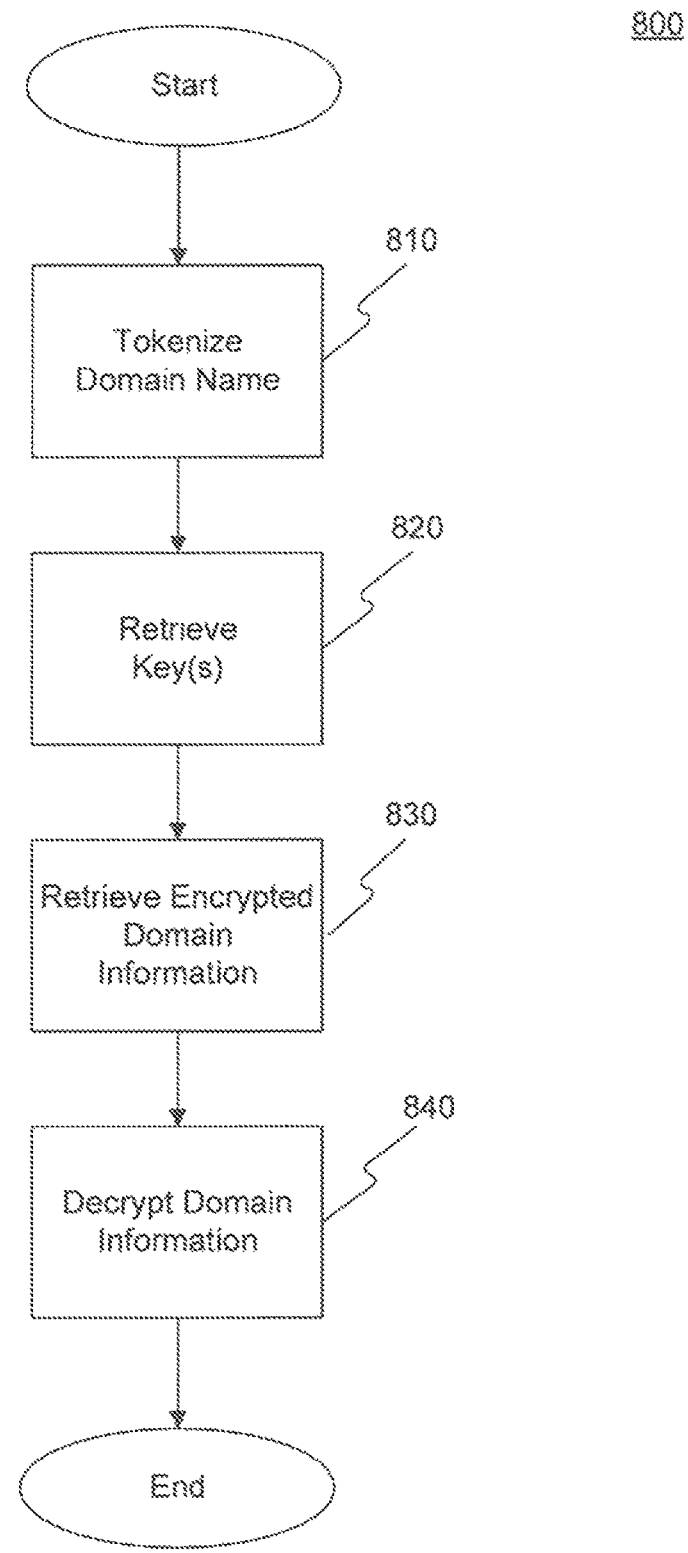
FIG. 8 illustrates an example process that uses privacy preserving techniques to find information associated with or corresponding to a domain name.

FIG. 8 illustrates an example process 800 that uses privacy preserving techniques to find information corresponding to or associated with a domain name. In step 810, a user may tokenize a domain name via a tokenizing authority 140. Similar to the process 200 described above, the tokenizing authority 140 would use a tokenizing function on the submitted domain name and return a tokenized string of characters representing the domain name. In some implementations, further privacy preserving techniques may take place by using a blinding preprocessing function consistent with the process 600 described above. In step 820, the user may use the domain name (or tokenized domain name) to obtain the decryption key(s) corresponding to the domain name from the tokenizing authority 140. The decryption key(s) may be returned along with the tokenized domain name in step 810. In implementations with further privacy preserving techniques, the user may obtain the decryption key(s) without the tokenizing authority learning the key(s) or the domain name. In step 830, the optionally encrypted related domain information may be retrieved from the tokenized list holder 150 based on the tokenized domain string. One skilled in the art will recognize that one tokenized list holder 150 may store the tokenized domain names and another tokenized list holder 150 may store the optionally encrypted domain related information. Using the decryption key, the domain related information is decrypted in step 840.

The implementations disclosed above may be monetized by providing the privacy preserving registry browsing service as a fee-based service. In particular, a registrar 120 or one or more registries 130 supporting a tokenized database of domain names and corresponding information, as well as a tokenizing authority 140 may each require subscriptions and/or payment for private domain name queries. Alternatively, an account may be held with one of these entities which collects the fees and distributes them to the other entities. A service offering privacy preserving registry browsing may charge users on a subscription or per use basis. Alternatively, a third-party account manager may serve as an intermediary between a potential registrant 110 or domain name information browser and the tokenizing authority 140 or other entity or service. The third-party account manager could serve as an additional abstraction buffer between the security conscious user and the one or more registries 130 or registrar 120. In the case where the tokenizing authority 140 is trusted, the tokenizing authority 140 may be a good candidate to serve as an account manager for the purpose of monetizing privacy preserving registry browsing. Furthermore, even if monetary gain is not a primary objective, it may beneficial in terms of preserving privacy for access to the tokenizing authority 140 to be limited to a certain number of transactions per party over a given period of time, to avoid online dictionary attacks. For example, if the tokenized list holder 150 has unlimited access to the tokenizing functionality, then it may be able to determine the domain name that a user is searching for, and/or the domain names provided by the registrar 120, by trial and error. With access limits, such types of exhaustive search would be detected or slowed.

Although the disclosed implementations above preserve the privacy of the domain name lookup whether for purposes of registration or information gathering, some data may be collected and analyzed to further promote the usefulness of the embodied systems. For example, the supporting registrar 120 or one or more registries 130 may log information that a query was performed, log the tokenized query string, and log the calculations and responses as appropriate for analysis later. If an account is required by the supporting registrar 120 or one or more registries 130, the log information can be tied to a particular account holder. The collected data can be correlated to domain name registrations and lookup requests that are performed in the clear. Additionally, trending analysis may be done to determine how many private operations are performed by a single user session. It may also be determined whether any domain name variants that were suggested were specifically searched in the same or in a later session.

Figure 9:
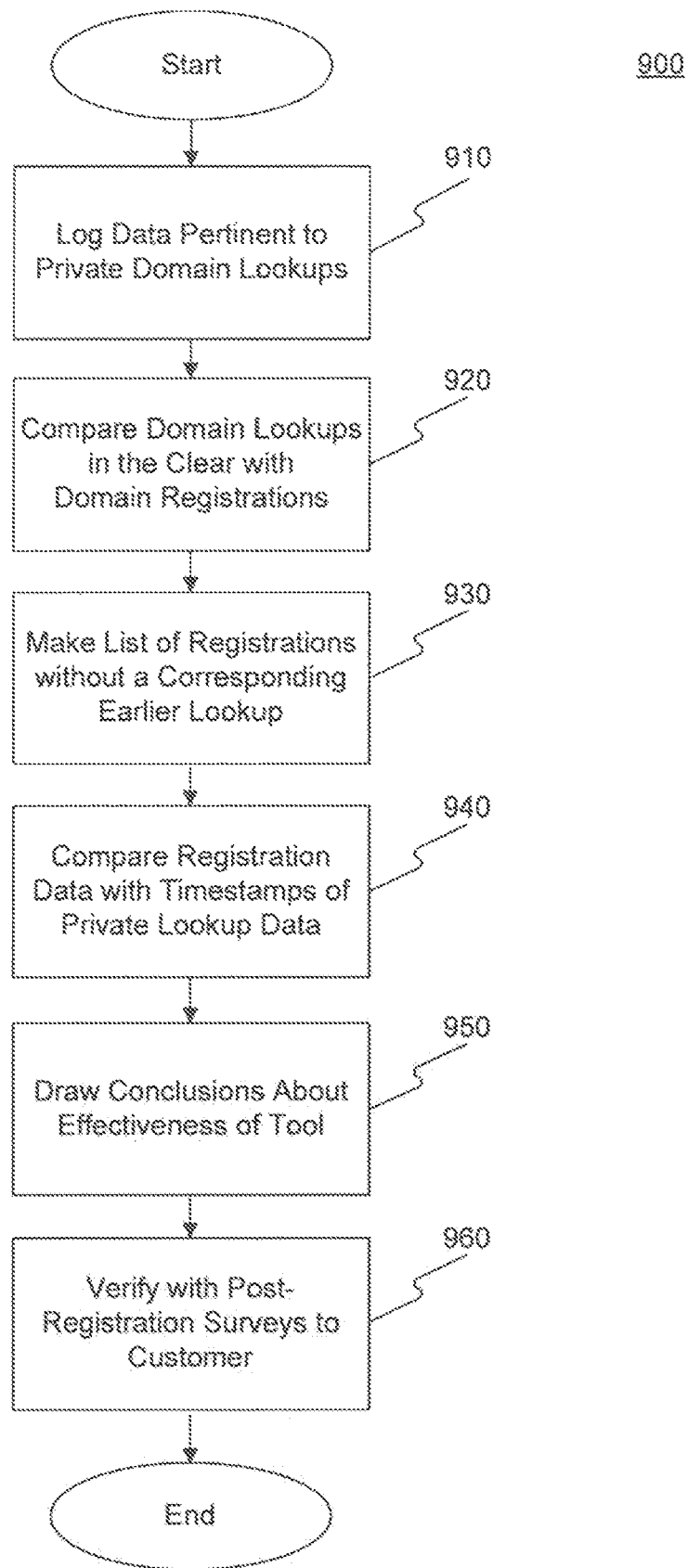
FIG. 9 illustrates an example process of correlating log data to determine the effectiveness of a privacy preserving registry browser.

FIG. 9 illustrates an example process 900 of correlating log data to determine the effectiveness of a privacy preserving registry browser. In step 910, data pertinent to the privacy preserving registry browser operation can be logged on a continuous basis, for instance by the tokenizing authority 140 and/or other entity or service. Such data may include logging the tokenized query string, the number of domain name variants created and eliminated as unavailable (where applicable), timestamps corresponding to the lookup process, and the like. In step 920, domain lookups in the clear are compared with domain registrations. Typically, a user 110 will look up whether a domain name is available prior to registration. If the lookup request was performed privately, an orphaned domain registration (one without a corresponding lookup request) may have been performed via the privacy preserving registry browser. In step 930, a list of such orphaned domain names may be made, for instance again by the tokenizing authority and/or other entity or service. Orphaned domain registration timestamps may be compared to timestamps from private domain lookup requests to further correlate the queries, as in step 940. If an account is required to perform private lookups, registrations made by the same organization would help to further correlate private lookups with subsequent registrations. Alternatively, once a list of orphaned domain names is available from step 930 and possibly narrowed through timestamp comparison as in step 940, the privacy preserving registry may submit the registered domain names to the tokenizing authority 140 and cross-reference the resulting tokenized domain strings to determine whether the strings were previously queried. (It should be understood that because the correlation can be performed only after the domain name has been registered, the requester's initial search for the domain name still remains private while the search is occurring. Moreover, if the requester checks whether several domain names have been registered prior to choosing and registering one, the alternate domain names checked but not registered also remain private.)

In step 950, conclusions may be made, by the tokenizing authority 140 and/or other entity or service, about the effectiveness of the privacy preserving registry browsing tool. Conclusions would likely be drawn upon whether the data could be correlated to reveal an approximate number of private lookups that resulted in subsequent registrations. In step 960, post registration surveys may optionally be sent to the customer to help verify the conclusions about the effectiveness of the privacy preserving registry browsing tool.

While FIG. 9 illustrates certain illustrative logging and inference techniques, other techniques related to logging data related to the tokenization and registration process can be used. For instance, logging, inference, and other associated techniques such as those described in U.S. Pat. No. 8,224,923, issued Jul. 17, 2012, entitled "Characterizing Unregistered Domain Names," and in co-pending U.S. application Ser. No. 12/755,049 filed Apr. 6, 2010, entitled "Domain Popularity Scoring," each of which is assigned or under obligation to the same entity as this application, and each of which is incorporated by reference in its entirety herein, can also or instead be used.

Although the foregoing descriptions have generally related to domain name queries, it is understood that the methods and systems may also be applied for preserving privacy of queries in a general sense, and/or for other specific types of data. In the general sense, a requester (e.g., potential registrant 110) makes queries (e.g., domain name queries) for availability of or information about a particular type of private data (e.g., domain names) in a data list or source (e.g., registry 130). Examples of other data types include IP addresses, email addresses, phone numbers, malware attack signatures, trademark strings, and other data types where it is useful to have a way to compare matches among data values, and optionally to convey additional data associated with those values, while preserving privacy.

For instance, security providers may wish to share with subscribers information about potentially suspicious IP addresses and malware, such that the subscribers only learn that information if they have also arrived at the same suspicion, i.e., if they already know the IP address or malware attack signature. Similarly, merchants may wish to share with web sites the email addresses and phone numbers of their customers, such that the web sites only learn that there is a match if they already know at least some of the information themselves. For example, the email addresses and phone numbers may both be employed separately as query terms, with the corresponding information included as additional related data, optionally encrypted. The methods and systems herein can be applied in such cases as well.

The data source may interact with a tokenizing authority to obtain tokenized versions of its data; the data source may provide the tokenized versions to a tokenized data holder; the requester may also interact with a tokenizing authority to obtain tokenized version of its data; the requester may provide the tokenized versions to the tokenized data holder; and the tokenized data holder may compare the requester's tokenized version to the data source's tokenized version and return the results of the comparison to the requester. In addition, a proxy server may perform one or more of the operations of the data source or data requester. For instance, the data source or data requester may provide a query term to the proxy server, which then acts on behalf of the data source or data requester by interacting with the tokenizing authority and/or tokenized data holder as described herein. The proxy server thus serves as an extension of the data source or data requester. This may be beneficial if the data source or data requester has limited computational capabilities or constraints on its interactions that can be ameliorated by outsourcing operations to the proxy server.

As in the implementations described above, the interactions may be extended to convey data related to the query (or metadata), which may also be encrypted. In cases, the data source's interactions with the tokenizing authority for a given query term may also produce an encryption key; the data source may encrypt metadata values associated with the query term with the encryption key; the data source may provide the encrypted metadata values to the tokenized data holder; the requester's interactions with a tokenizing authority for a given query term may produce a corresponding decryption key; as a result of a successful comparison, the tokenized data holder may provide the encrypted metadata value to the requester; and the requester may decrypt the encrypted metadata value with a decryption key.

The interactions with the tokenizing authority may employ blinding and unblinding operations to preserve privacy of data values, tokenized data values, and encryption keys, relative to the tokenizing authority. They can also employ metering and other access controls to strengthen privacy protections further against attempted compromise by a requester, data source, or other party. In some cases, the functions of more than one actor can be realized by the same party in an actual implementation.

The methods and systems have been generally described in terms of a single instance of each of the actors: data source, registrant 110 or other requester 110, registrar 120, registry 130, tokenizing authority 140, and tokenized list holder 150. However, it will be appreciated that the methods and systems herein can also support multiple instances and/or combinations of those entities. For instance, more than one requester can interact with the same tokenizing authority 140, and provide tokenized values to be matched by the same tokenized list holder 150. Likewise, more than one data source can interact with the same tokenizing authority 140 and provide tokenized values to the same tokenized list holder 150. Thus, a single tokenizing authority 140 and tokenized list holder 150 can enable not just a single requester and data source to preserve the privacy of their queries, but a community of requesters and data sources. The methods and systems thus enable an ecosystem where multiple requesters and data sources can compare matches among data values and convey additional metadata.

Furthermore, because of the intermediation by the tokenizing authority 140 and the tokenized list holder 150, not only can the privacy of the data values and metadata values be preserved, but also the identities of the requesters and the data sources. In some applications, a data source may prefer not to disclose its identity directly to requesters, but may be willing to do so to an intermediary. The tokenized list holder 150 thus acts a representative of the community of data sources, concealing their actual identities from the requesters, yet still being able to compare values on the requesters' behalf. It likewise acts as a representative of the community of requesters, concealing their identities, yet still being able to compare values and report aggregate results back to the data sources.

Although a single tokenizing function is sufficient to enable multiple requesters and data sources, it may be beneficial to have multiple tokenizing functions. Different tokenizing functions may be employed at different points in time, to reduce concern about the compromise of secret keys associated with the functions. Different functions may be employed for data values of different classifications, which may be based on security attributes, geolocation, or other factors. The data source may select one or more tokenizing functions to employ for a given data value based on the classification(s) of the data. Likewise, a requester may select one or more tokenizing functions based on the requester's permissions to access data values of certain classification(s). A requester may thus only learn that its data value matches a data source's data value if the requester has permission for the tokenizing function associated with appropriate classification. Furthermore, different tokenizing functions may be employed for determining encryption or decryption keys depending on metadata classification, and the tokenizing function for determining the tokenized query term may be different than the tokenization function(s) for determining the associated encryption or decryption key(s). Different metadata associated with the same data value may have different classifications and would then be encrypted with different keys. Thus, even if a requester is able to learn that its data value matches a data source's data value, the requester may only obtain associated metadata on a "need-to-know" basis.

The multiple tokenizing functions may be assigned to a single tokenizing authority 140, or they may be assigned to two or more different tokenizing authorities 140. Further, although a single tokenized list holder 150 is sufficient to enable multiple requesters and data sources, it may likewise be beneficial to have multiple tokenized list holders 150 for similar reasons to those just described. Access to different tokenized list holders 150 may similarly be controlled based on classifications and permissions.

In addition to returning an indication of whether a comparison has been successful, and optionally encrypted metadata values, the tokenized list holder 150 may also return, depending on the requester's permission, other information it may have stored about the match. For instance, the tokenized data holder or tokenized list holder 150 may also return to the requester 110 the number of matches it has seen for the particular tokenized data value (even as it may provide such aggregate results back to the data sources). The number of matches seen may be useful information to the requesters 110 (and data sources), as it gives an indication of what other requesters 110 or data sources are querying. Thus, the response to a requester's query is not limited to matching or metadata, but may include other information that can be provided by the tokenized list holder 150.

Various enhancements may be employed to strengthen security further using techniques known in the art. For instance, the tokenizing function and its secret key(s) can be distributed using threshold cryptography across multiple servers, such that at least a designated subset of those servers must participate in the process of computing the function. This reduces concern about the compromise of secret key(s) or key shares stored at any smaller subset of servers.

In some implementations, a requester 110 may send a query term to a tokenizing authority 140 to calculate a decryption key for decrypting associated encrypted metadata held by a data store operator. The query term may be submitted without tokenization to the data store to retrieve the encrypted record associated with the query term. The requester 110 may use the calculated decryption key to decrypt the metadata.

Other implementations of the disclosure will be apparent to those skilled in the art from consideration of the specification and practice of the implementations disclosed herein. In particular, it should be appreciated that the processes defined herein are merely examples, and that the steps of the processes need not necessarily be performed in the order presented. It is intended that the specification and examples be considered as examples only, with a true scope and spirit of the implementations being indicated by the following claims.

In some embodiments, the interactions between the registrant 110 (or any other information requesting entity), the tokenizing authority 140, and the tokenized list holder 150 described above are extended to provide authenticated denial of existence. In an authenticated denial of existence process, the tokenized list holder 150 provides some level of proof that a query term or the associated requested data does not exist in a database. For example, various Domain Name System Security Extensions (DNSSEC) protocols provide techniques to authenticate and increase the privacy of DNS data based on authenticated denial of existence records.

Figure 11:
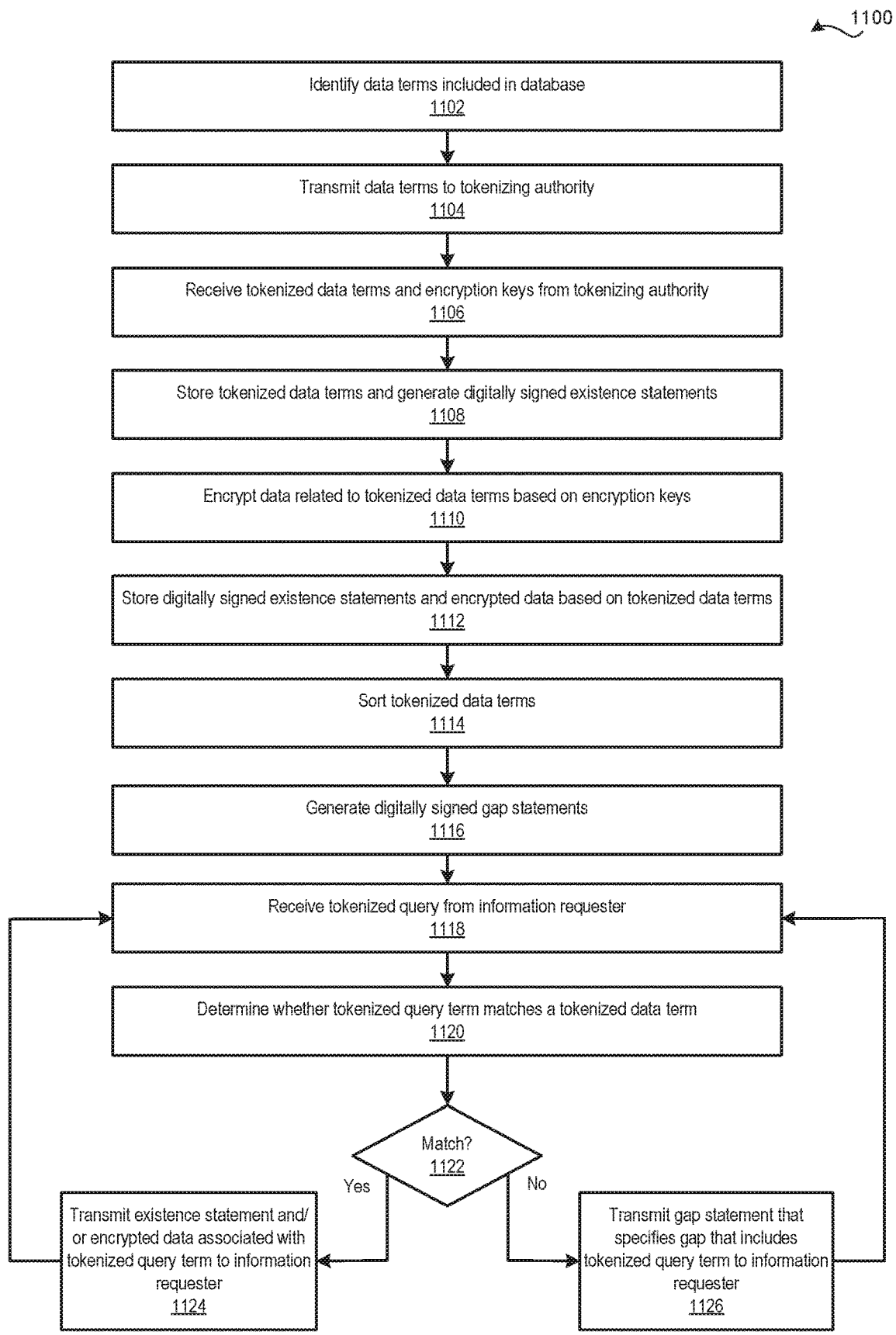
FIG. 11 is a flow diagram of method steps for servicing a database request, according to various embodiments of the present invention.
Figure 12:
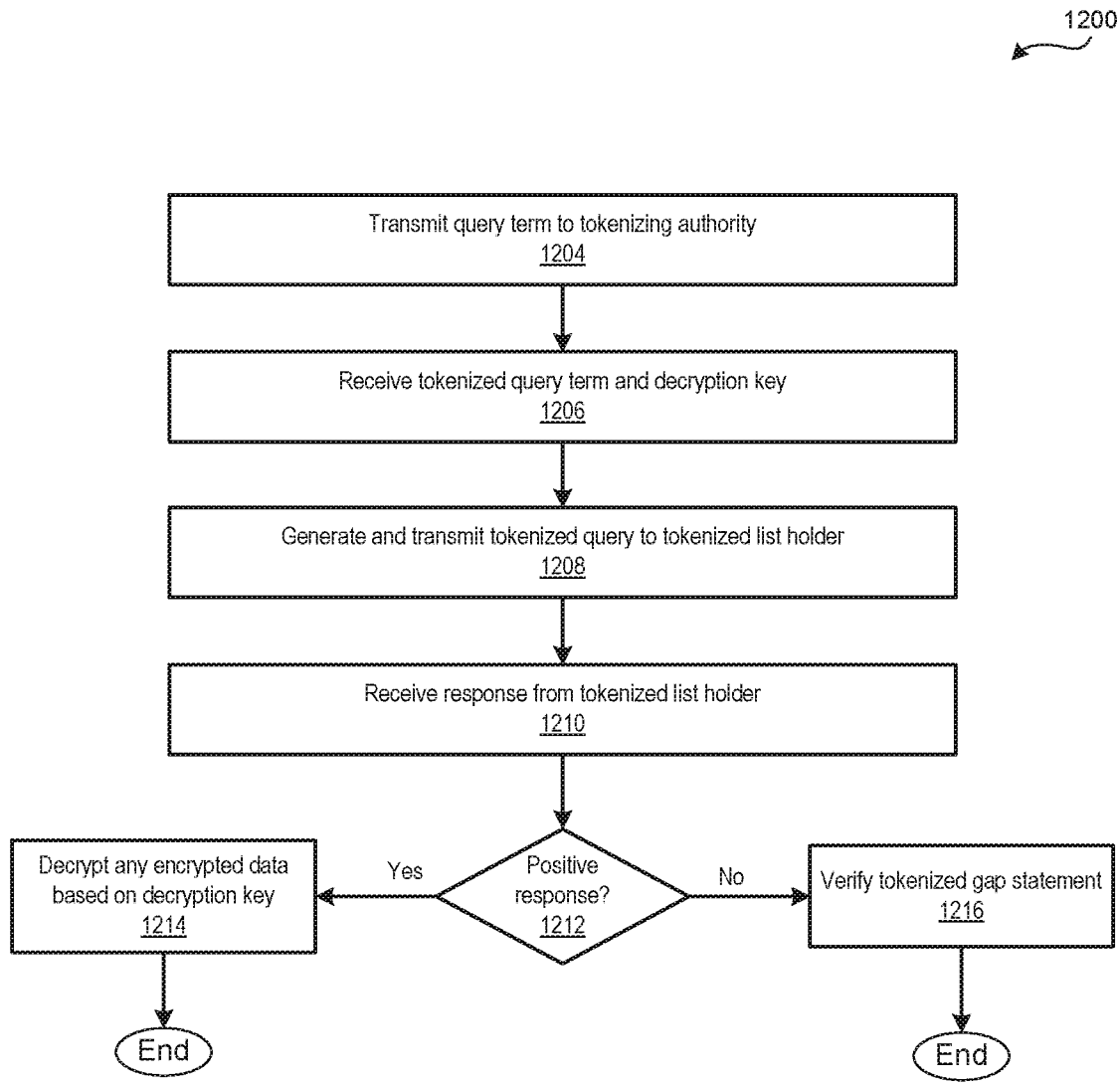
FIG. 12 is a flow diagram of method steps for preserving the privacy of a query term when requesting information from a database, according to various embodiments of the present invention.

In NSEC3 and NSEC5, an authenticated denial of existence record provides proof that a query term does not exist by specifying a gap between tokenized terms. The authenticated denial of existence DNS record shows that the query term does not exist by specifying a "gap" within a sorted listing of existing tokenized terms. A tokenized term corresponding to the query term in question should appear within the gap if that query term did, in fact, exist. However, neither NSEC3 nor NSEC5 enables the information requesting entity to query the tokenized list holder 150 for information without disclosing the query term to the tokenized list holder 150. To address this limitation, FIGS. 10-12 present embodiments that provide some level of verification that information does not exist in a database or databases based on tokenized query terms.

As a general matter, the description of various embodiments are presented herein for purposes of illustration, but are not intended to be exhaustive or limited to the embodiments disclosed. For example, FIGS. 10-12 present embodiments that enable privacy-preserving querying with authenticated denial of existence based on digitally signed authenticated denial of existence records that include tokenized terms. However, it will be apparent to one of skilled in the art that denial of existence may be provided without one or more of the specific details specified in FIGS. 10-12. Further, many modifications and variations will be apparent to those of ordinary skill in the art without departing from the scope and spirit of the described embodiments.

Denials of Existence

Figure 10:
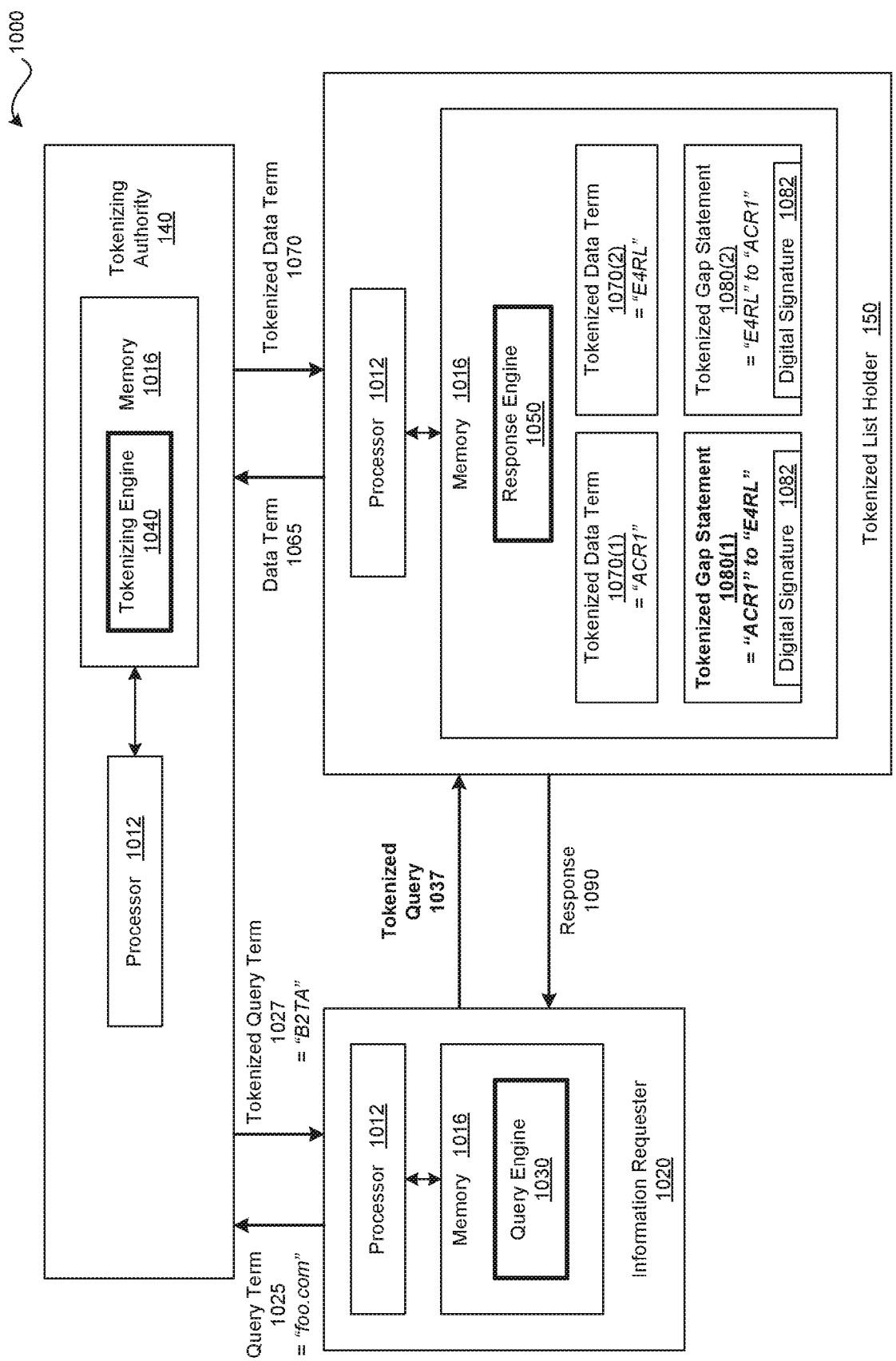
FIG. 10 is a conceptual illustration of a system configured to enable privacy-preserving querying with authenticated denial of existence, according to various embodiments of the present invention.

FIG. 10 is a conceptual illustration of a system 1000 configured to enable privacy-preserving querying with authenticated denial of existence, according to various embodiments of the present invention. As shown, the system 1000 includes, without limitation, an information requester 1020, the tokenized list holder 150, and the tokenizing authority 140. The information requester 1020 may be any entity that requests information from the tokenized list holder 150. For example, in some embodiments the information requester 1020 is the registrant 110 and the tokenized list holder is a name server. Although not shown, the system 1000 may also include one or more networks that allow the information requester 1020, the tokenized list holder 150, and the tokenizing authority 140 to communicate with one another over any combination of wired and/or wireless networks, many of which are known in the art. In alternate embodiments, the system 1000 may include any number of information requesters 1020, any number of tokenized list holders 150, and any number of tokenizing authorities 140.

As shown, the information requester 1020, the tokenized list holder 150, and the tokenizing authority 140 each includes a processor 1012 and a memory 1016. The processor 1012 may be any instruction execution system, apparatus, or device capable of executing instructions. For example, the processor 1012 could comprise a central processing unit (CPU), a digital signal processor (DSP), a controller, a microcontroller, a state machine, or any combination thereof.

The memory 1016 stores content, such as software applications and data, for use by the associated processor 1012. The memory 1016 may be any type of non-volatile memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory 1016. The storage may include any number and type of external memories that are accessible to the processor 1012. For example, and without limitation, the storage may include a Secure Digital Card, an external Flash memory, a portable compact disc read-only memory (CD-ROM), an optical storage device, a magnetic storage device, or any suitable combination of the foregoing.

In alternate embodiments, each of the information requester 1020, the tokenized list holder 150, and the tokenizing authority 140 may include any number (including zero) and types of processors 1012 and any number (including zero) and types of memories 1016 in any combination. The processors 1012 and the memories 1016 may be implemented in any technically feasible fashion. For example, and without limitation, in various embodiments, each of the processors 1012 and/or the memories 1016 may be implemented as a stand-alone chip or as part of a more comprehensive solution that is implemented as an application-specific integrated circuit (ASIC) or a system-on-a-chip (SoC). In some embodiments, the information requester 1020, the tokenized list holder 150, and the tokenizing authority 140 may interact with one or more clouds (e.g., encapsulated shared resources, software, data, etc.) to perform operations associated with the system 1000. In such embodiments, any number of the processors 1012 and/or the memories 1016 may be implemented in the cloud instead of in the information requester 1020, the tokenized list holder 150, and the tokenizing authority 140.

As a general matter, the information requester 1020 generates tokenized queries 1037 that request information from the tokenized list holder 150 based on tokenized query terms 1027 that are derived from query terms 1025. The tokenized list holder 150 responds to the tokenized queries 1037 based on a database of information that is associated with data terms 1065. Because the tokenized queries 1037 do not include the query terms 1025, the query terms 1025 are not disclosed to the tokenized list holder 150 during the querying process.

For explanatory purposes, both the data terms 1065 and the query terms 1025 are also referred to herein as "terms," and each term may be any type of data (e.g., a string, a domain name, an Internet Protocol (IP) address, etc.). Further, each of the tokenized queries 1037 may request any information that is associated with the data terms 1065. For example, in various implementations, the query term may be a domain name and the requested information may be any number of an IP address, name server data, WHOIS data, Registration Data Access Protocol (RDAP) data, and the like.

In response to the tokenized query 1037, if the requested information exists in the database associated with the data terms 1065, then the tokenized list holder 150 transmits a response 1090 to the information requester 1020 that indicates a positive result. The "positive" response 1090 may be a confirmation of existence and/or may include any amount of information that may be optionally encrypted in whole or in part with an encryption key based on the data term 1065. However, if the requested information does not exist in the database associated with the data terms 1065, then the tokenized list holder 150 transmits the response 1090 to the information requester 1020 that indicates a negative result. Notably, the negative result includes an authenticated denial of existence record and an optional proof.

To enable the tokenized list holder 150 to respond correctly to the tokenized query 1037, the system 1000 includes, without limitation, a response engine 1050, a tokenizing engine 1040, and a query engine 1030. As shown, the response engine 1050 typically resides in the memory 1016 included in the tokenized list holder 150 and executes on the associated processor 1012. The tokenizing engine 1040 typically resides in the memory 1016 included in the tokenizing authority 140 and executes on the associated processor 1012. The query engine 1030 typically resides in the memory 1016 included in the information requester 1020 and executes on the associated processor 1012.

As a general matter, the response engine 1050, the tokenizing engine 1040, and the query engine 1030 are configured to share a functionally equivalent tokenizing process. More specifically, if the query term 1025 matches the data term 1065, then the tokenized query term 1027 corresponding to the query term 1025 matches a tokenized data term 1070 corresponding to the data term 1065. Further, if the tokenized query term 1027 matches the tokenized data term 1070, then the query term 1025 corresponding to the tokenized query term 1027 matches the data term 1065 corresponding to the tokenized data term 107.

As part of an initialization process, the response engine 1050 identifies the data terms 1065 included in the associated database. The response engine 1050 may identify the data terms 1065 in any technically feasible fashion. For example, in some embodiments, the database is a collection of DNS records and the response engine 1050 identifies the domain names included in the DNS records as the data terms 1065. The response engine 1050 then transmits each of the data terms 1065 to the tokenizing engine 1040. For each of the data terms 1065, the tokenizing engine 1040 executes one or more tokenizing algorithms to compute the tokenized data term 1050. The tokenizing authority 140 then transmits the tokenized data terms 1070 to the response engine 1050.

In general, for a given term, the tokenizing engine 1040 may compute the corresponding tokenized term based on any portion (including all) of the term and/or any other information. The other information may be derived or generated based on one or more tokenizing algorithms. The tokenizing algorithm(s) may be modified, reseeded, or substituted as needed to help protect against reverse engineering and the unauthorized decrypting of the tokenized term.

After receiving the tokenized data terms 1070, the response engine 1050 stores the tokenized data terms 1070. Further, for each of the tokenized data terms 1070, the response engine 1050 creates mappings to the portion(s) of the database that include the corresponding data term 1065. The response engine 1050 may create mappings between the tokenized data terms 1070 and the relevant portions of the database in any technically feasible fashion. For example, in some embodiments, the database is a collection of DNS records and the data terms 1065 are domain names. In such embodiments, the response engine 1050 may store the DNS records that include a given domain name in the memory 1016 based on the tokenized domain name.

In various embodiments, for each term, the tokenizing engine 1040 may be configured to provide an encryption and decryption key based on the term. In such embodiments, the response engine 1050 may encrypt any portion (including all) of the database via the associated encryption key prior to storing the database. Further, in some embodiments, the response engine 1050 may store "signed" portions of the database. In such embodiments, the response engine 1050 may generate the signed portions of the database in any technically feasible fashion. For example, the response engine 1050 could transmit DNS records to a DNS signer, receive the signed DNS records, and then store the signed DNS records. In such embodiments, the response engine 1050 could also encrypt the signed DNS records.

After receiving the tokenized data terms 1070, the response engine 1050 also generates and stores one or more tokenized gap statements 1080. As shown, each of the tokenized gap statements 1080 specifies, without limitation, two of the tokenized data terms 1070, referred to herein as a "starting" tokenized data term 1070 and an "ending" tokenized data term 1070. In operation, the tokenizing engine 1040 sorts the tokenized data terms 1070 to generate a sorted list (not shown). The tokenizing engine 1040 may sort the tokenized data terms 1070 in any technically feasible fashion based on any deterministic sorting algorithm that implements any predetermined sorting order.

For example, the tokenizing engine 1040 may implement a sorting algorithm that produces the sorted list based on the lexicographical order of the tokenized data terms 1070. The starting and ending tokenized data terms 1070 may or may not themselves be included in the database. The tokenized gap statement 1080 should be understood as indicating that no tokenized data terms 1070 between the "starting" and "ending" values are included in the database. The first and last gap statements 1080 associated with the list may be handled specially to indicate that the first gap includes all the tokenized data terms 1070 below the first "ending" tokenized data term 1070, and likewise that the last gap includes all the tokenized data terms 1070 above the last "starting" tokenized data term 1080. Alternatively, the list may be "circular," where the last gap specifies both the last starting tokenized data term 1070 and the first ending tokenized data term 1070, and the out-of-order relationship of the two values indicates that the gap includes all the tokenized data terms 1070 above the first value, and all the tokenized data terms 1070 below the second one.

For each of the tokenized data terms 1070, the tokenizing engine 1040 then generates a single tokenized gap statement 1080. More specifically, for the tokenized data term 1070($x$), the tokenized gap statement 1080 specifies the tokenized data term 1070($x$) as the starting tokenized data term 1070 and the tokenized data term 1070 that immediately follows the tokenized data term 1070($x$) in the sorted list as the ending tokenized data term 1070. Accordingly, no tokenized data terms 1070 exist between the starting tokenized data term 1070 and the ending tokenized data term 1070 within the sorted list.

As also shown, the tokenized gap statement 1080 also includes a digital signature 1082. The response engine 1050 may generate the digital signature 1082 in any technically feasible fashion. For example, the response engine 1050 could transmit the tokenized gap statements 1080 to a DNS signer and then store the returned, signed tokenized gap statements 1080. In alternate embodiments, the tokenized gap statement 1080 may not include the digital signature 1082. Further, in various embodiments, the response engine 1050 also generates digitally signed, existence statements (not shown) that provide confirmation that each of the data terms 1070 exist in the database associated with the tokenized list holder 150.

In alternate embodiments, the tokenized list holder 150 may identify the data terms 1065, determine the corresponding tokenized data terms 1070, and generate the tokenized gap statements 1080 in any technically feasible fashion and at any time. For example, in alternate embodiments, the response engine 1050 may generate one of the tokenized gap statements 1080 "on-the-fly" in response to a particular tokenized query 1037. In another example, in some alternate embodiments, the functionality of the tokenizing engine 1040 may be implemented in tokenized list holder 150 instead of or in addition to the tokenizing authority 140. Irrespective of where and how the tokenizing algorithms are implemented, the tokenized list holder 150 and the information requester 1020 ensure that functionally equivalent tokenizing algorithms are applied to terms to generate the corresponding tokenized terms. The functionally equivalent tokenizing algorithms enable the tokenized list holder 150 to respond properly to the tokenized queries 1037.

To generate a particular tokenized query 1037, the query engine 1030 included in the information requester 1020 transmits the query term 1025 to the tokenizing engine 1040 included in the tokenizing authority 140. In response to receiving the query term 1025, the tokenizing engine 1040 computes the tokenized query term 1027 and transmits the tokenized query term 1027 to the query engine 1030. The query engine 1030 generates the tokenized query 1037 that specifies the tokenized query term 1027. Subsequently, the tokenizing engine 1040 transmits the tokenized query 1037 to the query engine 1030. The shared tokenization functionality between the tokenized list holder 150 and the information requester 1020 enables the tokenized list holder 150 to respond correctly to the tokenized query 1037. More precisely, the tokenized list holder 150 generates the response 1090 to the tokenized query 1037 based on comparing the tokenized query term 1027 to the tokenized data terms 1070.

In various embodiments, for each query term 1025, the tokenizing engine 1040 may be configured to provide a decryption key based on the query term 1025. In such embodiments, the response 1090 may include encrypted data and the query engine 1030 may decrypt the encrypted data based on the decryption key. In some alternate embodiments, any portion (including all) of the functionality of the tokenizing engine 1040 may be implemented in information requester 1020 instead of or in addition to the tokenizing authority 140.

In various embodiments, the tokenizing engine 1040 may be configured to provide a proof in addition to a tokenized term. The proof may be used to verify that the tokenized term corresponds to the original term. In some such embodiments, the query engine 1030 and/or the response engine 1050 may perform one or more verification operations based on the proof to confirm that the tokenized term is the correct tokenization of the original term. Further, in some embodiments, the query engine 1020 and/or the response engine 1050 may transfer the proof to another entity to enable the entity to confirm that the tokenized term is correct.

For explanatory purposes only, FIG. 10 is annotated to illustrate an example of a query process that culminates in an authenticated denial of existence. First, the response engine 1050 identifies the two data terms 1065(1) and 1065(2) that are included in the database. The response engine 1050 transmits the two data terms 1065 to the tokenizing engine 1040. In response, the tokenizing engine 1040 returns the tokenized data terms 1070(1) "ACR1" and 1070(2) "E4RL." After sorting the tokenized data terms 1070, the response engine 1050 generates the tokenized gap statements 1080(1) and 1080(2). As shown, the tokenized gap statement 1080(1) includes the starting tokenized data term 1070(1) "ACR1" and the ending tokenized data term 1070(2) "E4RL." The tokenized gap statement 1080(2) includes the starting tokenized data term 1070(2) "E4RL" and the ending tokenized data term 1070(1) "ACR1."

The query engine 1030 transmits the query term 1025 "foo.com" to the tokenizing engine 1040 and, in response, receives the tokenized query term 1027 "B2TA." The query engine 1030 then transmits the tokenized query 1037 that requests a DNS record associated with the tokenized query term 1027 "B2TA" to the response engine 1050. The response engine 1050 compares the tokenized query term 1027 "B2TA" to the tokenized data terms 1070(1) and 1070(2), and determines that the requested DNS record associated with the tokenized query term 1027 "B2TA" does not exist in the database. The response engine 1050 then includes the appropriate tokenized gap statement 1080(1) "ACR1" to "E4RL" in the response 1090 to provide an authenticated denial of existence.

In alternate embodiments, the response engine 1050 may be configured to respond to both the tokenized queries 1037 and "legacy" queries that request information based on the query terms 1025 instead of the tokenized query terms 1027. Notably, in such embodiments, the response engine 1050 responds to a legacy query that requests information based on a particular query term 1025 that is not included in the data terms 1065 with the appropriate tokenized gap statement 1080. The response engine 1050 may be configured to respond to both tokenized queries 1037 and legacy queries in any technically feasible fashion.

For example, in some embodiments, the information requester 1020 generates a legacy query that requests information based on a particular query term 1025 that is not included in the data terms 1065. The information requester 1020 transmits the legacy query to the response engine 1050. After determining that the query term 1025 is not included in the data terms 1065, the response engine 1050 transmits the query term 1025 to the tokenizing engine 1040. In response to the query term 1025, the response engine 1050 receives the tokenized query term 1027 from the tokenizing engine 1040 and, optionally, any portion (including all) of a proof. The response engine 1050 then identifies the tokenized gap statement 1080 that specifies the gap within the sorted tokenized data terms 1070 where the tokenized query term 1027 should appear if the query term 1025 were included in the data terms 1065. The response engine 1050 generates the response 1090 that includes the identified tokenized gap statement 1080 and, optionally, the proof. Finally, the response engine 1050 transmits the response 1090 to the query engine 1030.

In some embodiments, the tokenized list holder 150 may not directly interact with the tokenizing authority 140. Instead, a separate entity may interact with tokenized list holder 150. For instance, in some embodiments and as described in FIG. 1, a data holder (e.g., the registry 130) and the tokenized list holder 150 are separate entities. In such embodiments, the data holder could interface with the tokenized list holder 150 as part of a provisioning operation. The data holder could compute the tokenized data terms 1070, the tokenized gap statements 1080, and/or the digital signatures 1082 and then provide the tokenized data terms 1070, the tokenized gap statements 1080, and/or the digital signatures 1082 to the tokenized list holder 150 for use by the response engine 1050.

FIG. 11 is a flow diagram of method steps for servicing a database request, according to various embodiments of the present invention. Although the method steps are described with reference to the systems of FIGS. 1-10, persons skilled in the art will understand that any system configured to implement the method steps, in any order, falls within the scope of the present invention.

As shown, a method 1100 begins at step 1102, where the response engine 1050 included in the tokenized list holder 150 identifies the data terms 1065 that are included in the database associated with the tokenized list holder 150. At step 1104, the response engine 1050 transmits the data terms 1065 to the tokenizing engine 1040. The response engine 1050 may transmit the data terms 1065 to the tokenizing engine 1040 in any technically feasible fashion. In various embodiments, the response engine 1050 transmits the data terms 1065 sequentially, substantially in parallel, through batch processing, or any other manner as known in the art.

At step 1106, the response engine 1050 receives the tokenized data terms 1070 that correspond to the data terms 1065 and the associated encryption keys (if any) from the tokenizing engine 1040. In alternate embodiments, the response engine 1050 may receive any type and number of "keys" from the tokenizing engine 1040. In such embodiments, the response engine 1050 may derive the encryption keys from the received keys in any technically feasible fashion. In other alternate embodiments, the tokenizing engine 1040 does not generate encryption keys and the method 1100 is modified accordingly. At step 1108, the response engine 1050 stores the tokenized data terms 1070 and generates mappings between the tokenized data terms 1070 and relevant portions of the database. As part of step 1108, in some embodiments, the response engine 1050 generates digitally signed existence statements for each of the tokenized data terms 1070.

At step 1110, for each tokenized data term 1070, the response engine 1050 encrypts at least a portion of the data that is mapped to the tokenized data term 1070 based on the encryption key associated with the tokenized data term 1070 to generate associated encrypted data. At step 1112, the response engine 1050 stores the digitally signed existence statements and the encrypted data based on the associated tokenized data terms 1070. At step 1114, the response engine 1050 sorts the tokenized data terms 1070 in lexicographical order to generate a sorted list. In alternate embodiments, the response engine 1050 may implement any type of sorting algorithm that generates any type of list that is sorted in any deterministic order.

At step 1116, the response engine 1050 generates digitally signed tokenized gap statements 1080 based on the sorted list. Each of the tokenized gap statements 1080 includes a starting tokenized data term 1070 and an ending tokenized data term 1070 that are immediately adjacent in the circular sorted list. The response engine 1050 may generate or obtain the digital signatures included in the tokenized gap statements 1080 in any technically feasible fashion. In alternate embodiments, the response engine 1050 may generate any denial of existence information in any technically feasible fashion instead of the tokenized gap statements 1080.

At step 1118, the response engine 1050 receives the tokenized query 1037 from the query engine 1030. The tokenized query 1036 requests information based on the tokenized query term 1026. At step 1120, the response engine 1050 determines whether the tokenized query term 1027 included in the tokenized query 1037 matches any of the tokenized data terms 1070. The response engine 1050 may determine whether the tokenized query term 1027 matches any of the tokenized data terms 1070 in any technically feasible fashion. For example, in some embodiments, the response engine 1050 performs comparison operations between the tokenized query term 1027 and the tokenized data terms 1070.

If, at step 1122, the response engine 1050 determines that the tokenized query term 1027 matches a "matching" tokenized data term 1070, then the method 1100 proceeds to step 1124. At step 1124, the response engine 1050 identifies the existence statement and/or encrypted data that is associated with the matching tokenized data term 1070. The response engine 1050 then transmits the identified existence statement and/or encrypted data to the query engine 1030 as the response 1090. The method 1100 then returns to step 1118, where the response engine 1050 receives a new tokenized query 1037.

If, however, at step 1122, the response engine 1050 determines that the tokenized query term 1027 does not match any of the tokenized data terms 1070, then the method 1100 proceeds directly to step 1126. At step 1126, the response engine 1050 identifies the tokenized gap statement 1080 that specifies the gap within the sorted tokenized data terms 1070 where the tokenized query term 1027 should appear if the query term 1025 were included in the data terms 1065. The response engine 1050 then transmits the identified tokenized gap statement 1080 to the query engine 1030 as the response 1090. The method 1100 then returns to step 1118, where the tokenized list holder 150 receives a new tokenized query 1037.

The response engine 1050 continues to cycle through steps 1118-1126, receiving the tokenized queries 1037 and generating the responses 1090 until the response engine 1050 stops operating. As persons skilled in the art will recognize, the response engine 1050 may process and respond to tokenized queries 1037 concurrently. Consequently, the response engine 1050 may be executing different method steps on different tokenized queries 1037 substantially in parallel. Further, the response engine 1050 may receive any number of tokenized queries 1037 from the query engines 1030 included in any number of the information requesters 1020. Notably, because the tokenized queries 1037 do not include the query terms 1025, the tokenized queries 1037 do not reveal the query terms 1025 to the response engine 1050. Further, because the tokenized gap statements 1080 do not include the data terms 1065, the tokenized gap statements 1080 do not reveal the data terms 1065 to the query engines 1030.

FIG. 12 is a flow diagram of method steps for preserving the privacy of a query term when requesting information from a database, according to various embodiments of the present invention. Although the method steps are described with reference to the systems of FIGS. 1-10, persons skilled in the art will understand that any system configured to implement the method steps, in any order, falls within the scope of the present invention.

As shown, a method 1200 begins at step 1204, where the query engine 1030 transmits the query term 1025 to the tokenizing engine 1040. At step 1206, the query engine 1030 receives the tokenized query term 1027 that corresponds to the query term 1025 and the associated decryption key from the tokenizing engine 1040. In alternate embodiments, the query engine 1030 may receive any type of "key" from the tokenizing authority 140. In such embodiments, the query engine 1030 may derive the decryption key from the received key in any technically feasible fashion. In other alternate embodiments, the tokenizing engine 1040 does not generate the decryption key and the method 1200 is modified accordingly.

At step 1208, the query engine 1030 generates the tokenized query 1037 that requests information from the tokenized list holder 150 based on the tokenized query term 1027. The query engine 1030 transmits the tokenized query 1037 to the response engine 1050 included in the tokenized list holder 150. At step 1210, the query engine 1030 receives the response 1090 from the response engine 1050. At step 1212, the query engine 1030 determines whether the response 1090 is positive or negative. A positive response 1090 includes the requested information or an existence statement. By contrast, a negative response 1090 indicates that the requested information does not exist in the database. An example of a negative response is one of the tokenized gap statements 1080.

If, at step 1212, the query engine 1030 determines that the response 1090 is positive, then the method 1200 proceeds to step 1214. At step 1214, the query engine 1030 decrypts any encrypted data included in the response 1090 based on the decryption key, and the method 1200 terminates. If, however, at step 1212, the query engine 1030 determines that the response 1090 is negative, then the method 1200 proceeds directly to step 1216. At step 1216, the query engine 1030 verifies the tokenized gap statement 1080 and the method 1200 terminates. The query engine 1030 may verify the tokenized gap statement 1080 in any technically feasible fashion. For example, in some embodiments, the query engine 1030 verifies the digital signature 1082 included in the response 1090. In other embodiments, the query term 1030 verifies that the tokenized query term 1027 lies between the tokenized data terms 1070 included in the tokenized gap statement 1080. In alternate embodiments, the query engine 1030 may receive any type of denial of existence instead of the tokenized gap statement 1080.

Privacy-Preserving Tokenizing

Figure 13:
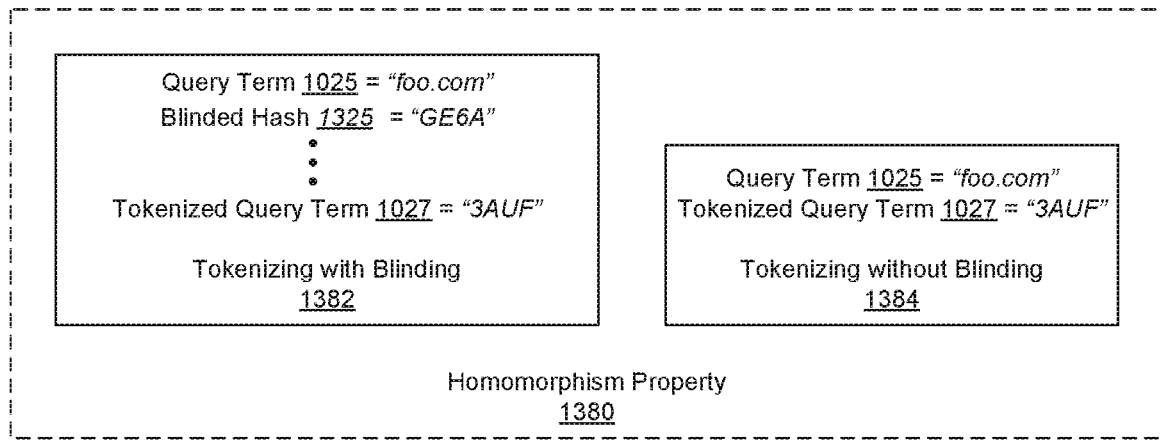
FIG. 13 sets forth more detailed illustrations of the tokenizing engine and the query engine of FIG. 1 configured to enable a privacy-preserving tokenizing process, according to various embodiments of the present invention.
Figure 13:
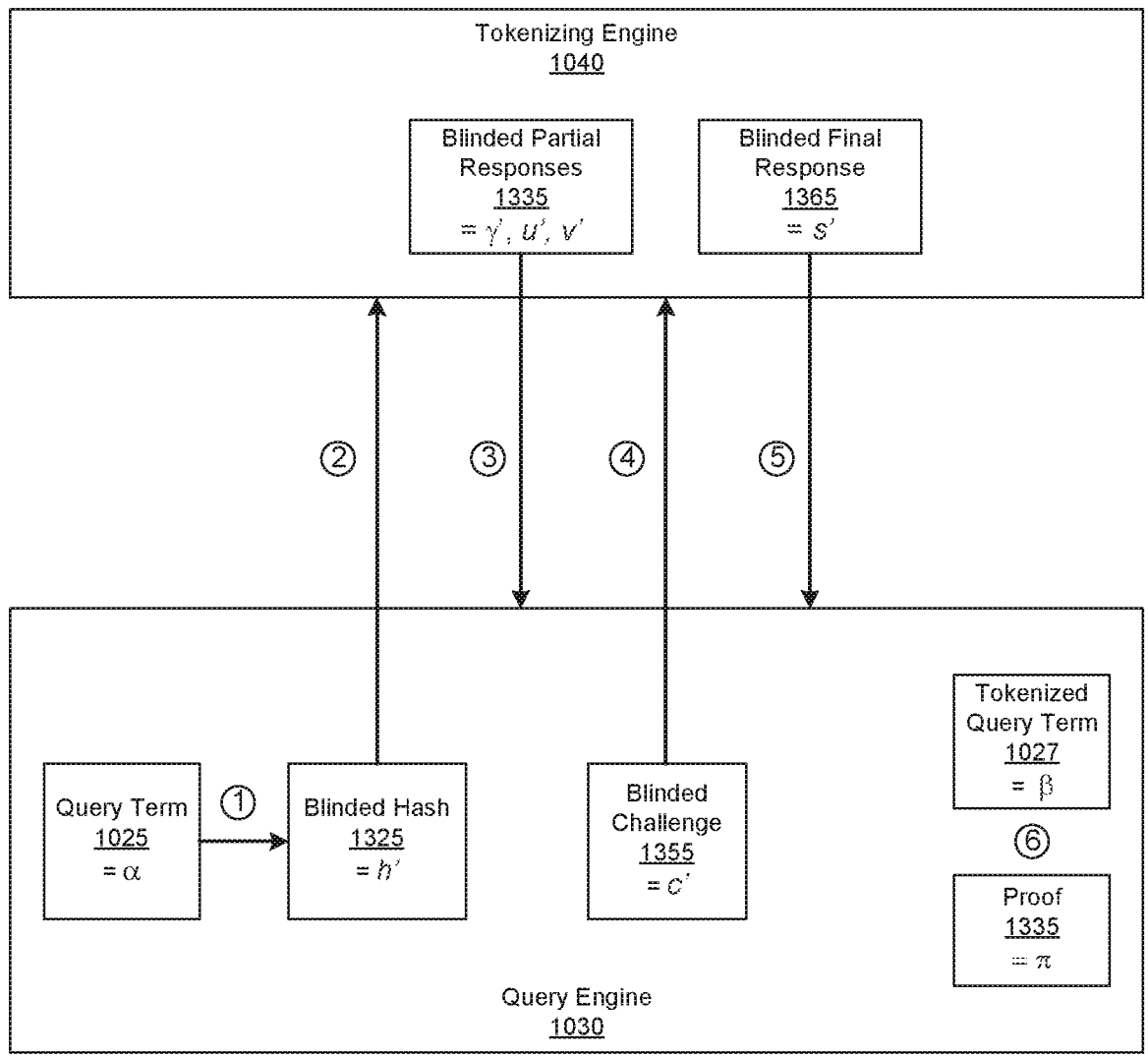
Figure 14:
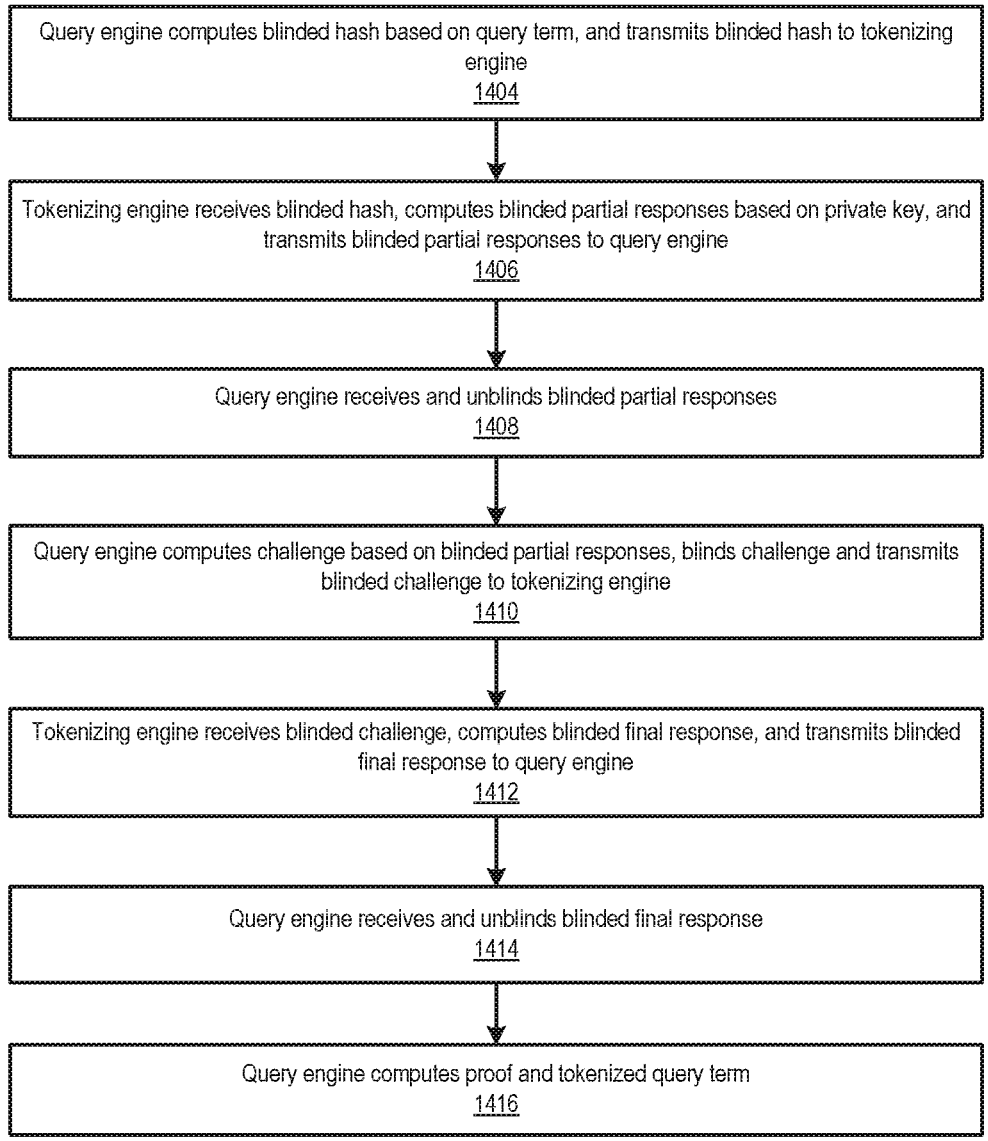
FIG. 14 is a flow diagram of method steps for preserving the privacy of a query term when interacting with a tokenizing authority, according to various embodiments of the present invention.

The system 1010 as described in FIGS. 10-12 enables the information requester 1020 to perform data querying activities that require some level of verification that information does not exist in a database without disclosing the query terms 1027 to the tokenized list holder 150. However, the information requester 1020 discloses the query terms 1027 to the tokenizing authority 140. To address this limitation, FIGS. 13-14 present embodiments in which the query engine 1030 collaborates with the tokenizing engine 1040 to generate the tokenized query term 1027 without revealing the query term 1025 to the tokenizing engine 1040. As persons skilled in the art will recognize, any of the techniques disclosed herein may be modified based on any of the other techniques to provide tokenizing functionality while providing any desired level of privacy and/or any type of denial of existence functionality.

FIG. 13 sets forth more detailed illustrations of the tokenizing engine 1040 and the query engine 1030 of FIG. 1 configured to enable a privacy-preserving tokenizing process, according to various embodiments of the present invention. Notably, the query engine 1030 collaborates with the tokenizing engine 1040 to compute the tokenized query term 1027 without revealing the corresponding query term 1025 to the tokenizing engine 1040. In alternate embodiments, the query engine 1030 may be replaced with the response engine 1050. In such embodiments, the response engine 1050 collaborates with the tokenizing engine 1040 to compute the tokenized data term 1070 without revealing the corresponding data term 1065 to the tokenizing engine 1040.

In various embodiments, the tokenizing engine 1040 may implement any technically feasible tokenizing algorithm. Further, the query engine 1030 and the tokenizing engine 1040 may implement any type of privacy-preserving algorithm that is consistent with the tokenizing algorithm. In general, as part of the privacy-preserving algorithm, the query engine 1030 applies a blinding algorithm to data prior to transmitting the data to the tokenizing engine 1040. Upon receiving blinded data from the query engine 1030, the tokenizing engine 1040 performs any number of operations on the blinded data to generate one or more blinded responses, and then transmits the blinded responses to the query engine 1030. The query engine 1030 applies an unblinding algorithm to the blinded responses to generate the corresponding (unblinded) responses.

Irrespective of the specific tokenizing algorithm, the blinding algorithm is a homomorphism relative to the tokenizing algorithm. As referred to herein, a "homomorphism" is characterized by a homomorphism property 1380. For explanatory purposes, suppose that a first algorithm is a homomorphism relative to a second algorithm. Further, suppose that the first algorithm is applied to an original term to generate a modified term, the second algorithm is applied to the modified term to generate a modified result, and finally the inverse of the first algorithm is applied to the modified result to generate a final result. Finally, suppose that the second algorithm is applied to the original term to generate a direct result. The homomorphism property 1380 specifies that the final result is equal to the direct result.

As shown, the homomorphism property 1380 is illustrated by an example of a tokenizing with blinding 1382 and an example of a tokenizing without blinding 1384. As part of the tokenizing with blinding 1362, the query engine 1030 applies a blinding algorithm to the query term 1025 "foo.com" to generate a blinded hash 1325 "GE6A." As described in detail below, the query engine 1030 transmits a variety of blinded data to the tokenizing engine 1040. The query engine 1030 applies an unblinding algorithm that effects the inverse of the blinding algorithm to the results received from the tokenizing engine 1040 to generate unblinded results. Finally, the query engine 1030 generates the tokenized query term 1027 "3AUF" based on the unblinded results.

By contrast, as part of the tokenizing without blinding 1384, the tokenizing engine 1040 applies the tokenizing algorithm to the query term 1025 "foo.com" to generate the tokenized query term 1027 "3AUF." Notably, irrespective of whether the system 1010 implements the tokenization with blinding 1382 process or the tokenization without blinding 1384 process, the tokenized query term 1027 computed for a given query term 1025 does not vary. However, if the system 1010 implements the tokenization with blinding 1382, then the query term 1025 is not disclosed to the tokenizing engine 1040. In various embodiments, the system 1010 may support both the tokenization with blinding 1382 process and the tokenizing without blinding 1384 process.

The system 1010 may implement any of many tokenizing algorithms. To enable the system 1010 to implement privacy-preserving tokenization, the system 1010 also implements a blinding algorithm that is a homomorphism relative to the tokenizing algorithm. As persons skilled in the art will recognize, for some tokenizing algorithms, constructing a blinding algorithm that is a homomorphism relative to the tokenizing algorithm is relatively complex and involves multiple steps.

For example, in some embodiments, the system 1010 may implement a tokenizing algorithm that is based on an elliptic curve/discrete logarithm cryptography (ECC) variant of NSEC5 referred to herein as "ECC NSEC5." The ECC NSEC5 tokenizing algorithm is based on an ECC key pair that includes a secret key "SK"=x, where x is random, and a public key "PK"=y=g^x, where g is a generator of order q. The secret key is known to the tokenizing engine 1040 but the secret key is not known to the query engine 1030. The public key is known to both the tokenizing engine 1040 and the query engine 1030.

Notably, an ECC NSEC5 tokenizing algorithm produces both the tokenized query term 1027 β and a proof 1335 π. Any entity may verify the proof 1335 based on the public key and then compute the tokenized query term 1027 based on the proof 1335. More specifically, for a given query term 1025 α, the tokenized query term 1027 is a hash of γ=h^x where h=H1(α). The proof 1335 π shows that log_h(γ)=log_g(y) (=x).

To enable privacy-preserving querying based on ECC NSEC5, the system 1010 implements a combined tokenizing and blinding process that incorporates a blinding algorithm that is based on the well-known Chaum-Pederson methodology. The blinding algorithm is a homomorphism relative to the ECC NSEC5 tokenizing algorithm. For explanatory purposes, FIG. 12 depicts a sequence of events involved in an ECC NSEC5 compatible privacy-preserving tokenizing process.

First, as depicted with the bubble numbered 1, the tokenization engine 1040 computes a blinded hash 1325 h' based on the query term 1025 α as follows:

$$h = H1(\alpha) \qquad (1)$$

$$h' = h^{r1}, \text{ where } r1 \text{ is a random value} \qquad (2)$$

As depicted with the bubble numbered 2, the query engine 1030 transmits the blinded hash 1325 to the tokenizing engine 1040. The tokenizing engine 1040 computes blinded partial responses 1335 γ', u', and v' as follows:

$$\gamma' = (h')^x \text{ where } x \text{ is a random value} \qquad (3)$$

$$u' = g^{k'}, \text{ where } k' \text{ is a random value} \qquad (4)$$

$$v' = h^{k'} \qquad (5)$$

As depicted with the bubble numbered 3, the tokenizing engine 1040 transmits the blinded partial responses 1335 to the query engine 1030. The query engine 1030 unblinds the blinded partial responses 1335 to generate the partial responses γ, u, and v; computes a challenge c, and blinds the challenge to generate a blinded challenge 1355 c' as follows:

$$\gamma = (\gamma')^{1/r1 \bmod q} \qquad (6)$$

$$u = ((u')g^{r3})^{r2}, \text{ where } r2 \text{ and } r3 \text{ are random values} \qquad (7)$$

$$v = ((v')^{1/r1 \bmod q} h^{r3})^{r2} \qquad (8)$$

$$c = H3(g, h, y, \gamma, u, v) \qquad (9)$$

$$c' = c/r2 \bmod q \qquad (10)$$

As depicted with the bubble numbered 4, the query engine 1030 then transmits the blinded challenge 1355 to the tokenizing engine 1040. The tokenizing engine 1040 computes a blinded final response 1365 s' as follows:

$$s' = (k' - c'x) \bmod q \qquad (11)$$

As depicted with the bubble numbered 5, the tokenizing engine 1040 transmits the blinded final response 1365 to the query engine 1030. Finally, as depicted with the bubble numbered 6, the query engine 1030 unblinds the final response 1365 to generate the final response s, computes the tokenized query term 1027 β and computes the proof 1335 π as follows:

$$s = (s' + r3)r2 \bmod q \qquad (12)$$

$$\beta = H2(\gamma) \qquad (13)$$

$$\pi = (\gamma, c, s) \qquad (14)$$

As persons skilled in the art will recognize, the query engine 1030 may perform verification operations to confirm that the tokenized query term 1027 β is a hash of γ=h^x, where h=H1(query term 1025 α). The query engine 1030 may also perform verification operations to confirm that the proof 1335 π shows that log_h(γ)=log_g(y) (=x).

FIG. 14 is a flow diagram of method steps for preserving the privacy of a query term when interacting with a tokenizing authority, according to various embodiments of the present invention. Although the method steps are described with reference to the systems of FIGS. 10 and 13, persons skilled in the art will understand that any system configured to implement the method steps, in any order, falls within the scope of the present invention.

As shown, a method 1400 begins at step 1404, where the query engine 1030 included in the information requester 1020 applies a blinding algorithm to the query term 1025 to generate the blinded hash 1325. The query engine 1030 then transmits the blinded hash 1325 to the tokenizing engine 1040 included in the tokenizing authority 140. At step 1406, the tokenizing engine 1040 receives the blinded hash 1325 and computes the blinded partial responses 1335 based on the blinded hash 1325 and a private key. The tokenizing engine 1040 then transmits the blinded partial responses 1335 to the query engine 1030.

At step 1408, the query engine 1030 receives the blinded partial responses 1335 and applies an unblinding algorithm to the blinded partial responses 1335 to generate partial responses. The unblinding algorithm effects the inverse of the blinding algorithm. At step 1410, the query engine 1030 computes a challenge based on the partial responses and applies the blinding algorithm to the challenge to generate the blinded challenge 1355. The query engine 1030 then transmits the blinded challenge 1355 to the tokenizing engine 1040.

At step 1412, the tokenizing engine 1040 receives the blinded challenge 1355 and computes the blinded final response 1365 based on the blinded challenge 1355 and the private key. The tokenizing engine 1040 then transmits the blinded final response 1365 to the query engine 1030. At step 1414, the query engine 1030 receives the blinded final response 1365 and applies the unblinding algorithm to the blinded final response 1365 to generate a final response. At step 1416, the query engine 1030 computes the tokenized query term 1027 based on the partial responses, the challenge, and the final response. In some embodiments, as part of step 1416, the query engine 1030 computes the proof 1335 based on the partial responses. The method 1400 then terminates. Advantageously, the method steps preserve the privacy of the query term 1025 while interacting with the tokenizing engine 1040.

In sum, the disclosed techniques may be used to comprehensive address both privacy and security concerns associated with data querying activities. In general, a centralized tokenizing authority provides repeatable, one-way tokenizing functionality to both information requesters and data holders. To preserve the privacy of data terms included in a database, the data holder interacts with the tokenizing authority to generate tokenized data terms corresponding to the data terms. The data holder then generates one or more digitally signed "positive" existence records that provide verifiable assurance as to the existence of the tokenized data terms. In a complementary fashion, the data holder generates one or more digitally signed "negative" gap records that provide verifiable assurance that tokenized query terms do not exist between tokenized data terms. For each gap between tokenized data terms organized in a lexicographical order, a corresponding gap record includes the two tokenized data terms that surround the gap.

To preserve the privacy of an information requester, the information requester interacts with the tokenizing authority to generate a tokenized query term corresponding to a query term. The information requester then transmits a tokenized query to the database holder to determine whether the tokenized query term is included in the tokenized data terms. If the tokenized query term matches any of the tokenized data terms, then the data holder returns the associated digitally signed existence record. If, however, the tokenized query term does not match any of the tokenized data terms, then the data holder returns the appropriate digitally signed gap record.

In some embodiments, the information requester includes blinding/unblinding functionality to ensure that query terms are not disclosed to the tokenizing authority during the tokenizing process. Prior to sending data (including the query terms) to the tokenizing authority, the information requester applies a blinding algorithm to the data. The tokenizing authority performs operations on blinded data to compute blinded responses. Upon receiving blinded responses from the tokenizing authority, the information requester applies an unbinding algorithm to the blinded responses to generate the responses. The tokenizing process terminates when the information requester generates the tokenized query term. Notably, the blinding algorithm implemented in the information requester is a homomorphism relative to the tokenizing process implemented between the information requester and the tokenizing authority. Consequently, the tokenized query term generated based on a blinded query term corresponding to an original query term is identical to the tokenized query term that is generate based on the original query term.

Advantageously, by providing functionally equivalent tokenizing mechanisms to both data holders and information requesters, the tokenizing authority protects the privacy of the data holders and the information requesters during data querying activities. Further, because the data holder returns verifiable results irrespective of whether a particular tokenized query term matches any of the tokenized data terms, the information requester can comprehensively verify the authenticity of the query results. Finally, by implementing a homomorphic blinding algorithm data terms and/or query terms need not be disclosed to the tokenizing authority.

1. In some embodiments, a computer-readable storage medium includes instructions that, when executed by a processor cause the processor to perform the steps of generating a plurality of sorted tokenized data terms that are associated with a database and based on a first tokenizing algorithm and a sorting order; receiving a query for information that includes a tokenized query term derived using the first tokenizing algorithm or a related second tokenizing algorithm; determining that the information is not included in the database based on the plurality of sorted tokenized data terms; and in response, generating a signed response that specifies a gap in the plurality of sorted tokenized data terms to indicate that the information is not included in the database.

2. The computer-readable storage medium of clause 1, wherein generating the signed response comprises determining that the tokenized query term lies between a first tokenized data term included in the plurality of sorted tokenized data terms and a second tokenized data term included in the plurality of sorted tokenized data terms; and generating a gap statement that includes the first tokenized data term and the second tokenized data term.

3. The computer-readable storage medium of clause 1 or 2, wherein generating the plurality of sorted tokenized data terms comprises identifying a plurality of data terms that are included in the database; interacting with a centralized tokenizing authority that implements a least a portion of the first tokenizing algorithm to generate a plurality of tokenized data terms based on the plurality of data terms; and sorting the plurality of tokenized data terms based on the sorting order.

4. The computer-readable storage medium of any of clauses 1-3, wherein interacting with the centralized tokenizing authority comprises applying a blinding algorithm to the plurality of data terms to generate a plurality of blinded data terms; transmitting the plurality of blinded data terms to the centralized tokenizing authority and, in response, receiving a plurality of blinded tokenized data terms from the centralized tokenizing authority; and applying an unblinding algorithm to the plurality of blinded tokenized data terms to generate the plurality of tokenized data terms.

5. The computer-readable storage medium of any of clauses 1-4, wherein the blinding algorithm is a homomorphism with respect to the first tokenizing algorithm.

6. The computer-readable storage medium of any of clauses 1-5, wherein the tokenized query term is derived from a query term using the first tokenizing algorithm or the related second tokenizing algorithm.

7. The computer-readable storage medium of any of clauses 1-6, wherein the query term comprises either a domain name or an Internet Protocol address, and the query comprises either a WHOIS request or a registration data access protocol (RDAP) request.

8. The computer-readable storage medium of any of clauses 1-7, wherein the first tokenizing algorithm is compliant with an NSEC5 protocol.

9. In some embodiments, a method for querying a database comprises determining a tokenized query term based on a query term and a first tokenizing algorithm; transmitting a request for information to a tokenized list holder that includes the tokenized query term, wherein the tokenized list holder has access to the database and a plurality of tokenized data terms that are associated with the database; and receiving a signed response from the tokenized list holder that specifies a gap in the plurality of tokenized data terms where the tokenized query term should be listed based on a predetermined sort order.

10. The method of clause 9, further comprising verifying a digital signature associated with the signed response.

11. The method of clauses 9 or 10, wherein the plurality of tokenized data terms are derived from the database using the first tokenizing algorithm or a related second tokenizing algorithm.

12. The method of any of clauses 9-11, wherein determining the tokenized query term comprises transmitting the query term to a centralized tokenizing authority that implements the first tokenizing algorithm and, in response, receiving the tokenized query term from the centralized tokenizing authority.

13. The method of any of clauses 9-12, wherein the query term comprises either a domain name or an Internet Protocol (IP) address.

14. The method of any of clauses 9-13, wherein the query comprises a WHOIS request or a registration data access protocol (RDAP) request.

15. The method of any of clauses 9-14, wherein the tokenized list holder comprises a name server.

16. The method of any of clauses 9-15, wherein determining the tokenized query term comprises applying a blinding function to the query term to generate a blinded query term; transmitting the blinded query term to a centralized tokenizing authority that implements at least a portion of the first tokenizing algorithm and, in response, receiving one or more blinded responses from the centralized tokenizing authority; and generating the tokenized query term based on the one or more blinded responses.

17. In some embodiments, a computer-readable storage medium includes instructions that, when executed by a processor cause the processor to perform the steps of applying a blinding algorithm to a query term or a data term to generate a blinded term; transmitting the blinded term to a tokenizing authority that implements at least a portion of a tokenizing algorithm; in response, receiving one or more blinded partial responses; computing a blinded challenge based on the one or more blinded partial responses; transmitting the blinded challenge to the tokenizing authority; in response, receiving one or more blinded final responses; computing a tokenized term based on the one or more blinded final responses; and generating or responding to a query based on the tokenized term.

18. The computer-readable storage medium of clause 17, wherein the blinding algorithm is a homomorphism with respect to the tokenizing algorithm.

19. The computer-readable storage medium of clauses 17 or 18, wherein computing the blinded challenge comprises applying an unblinding algorithm to the one or more blinded partial responses to generate one or more partial responses; computing a challenge based on the one or more partial responses; and applying the blinding algorithm to the challenge to generate the blinded challenge.

20. The computer-readable storage medium of any of clauses 17-19, wherein the tokenizing algorithm comprises an elliptic curve/discrete logarithm cryptography variant of an NSEC5 protocol.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-readable storage medium including instructions that, when executed by a processor, cause the processor to perform the steps of:
   generating a plurality of sorted tokenized data terms that are associated with a database and based on a first tokenizing algorithm and a sorting order;
   receiving a query for information that includes a tokenized query term derived using the first tokenizing algorithm or a related second tokenizing algorithm;
   determining that the information is not included in the database based on the plurality of sorted tokenized data terms; and
   in response, generating a signed response that specifies a gap in the plurality of sorted tokenized data terms to indicate that the information is not included in the database.

2. The computer-readable storage medium of claim 1, wherein generating the signed response comprises:
   determining that the tokenized query term lies between a first tokenized data term included in the plurality of sorted tokenized data terms and a second tokenized data term included in the plurality of sorted tokenized data terms; and
   generating a gap statement that includes the first tokenized data term and the second tokenized data term.

3. The computer-readable storage medium of claim 1, wherein generating the plurality of sorted tokenized data terms comprises:
   identifying a plurality of data terms that are included in the database;
   interacting with a centralized tokenizing authority that implements a least a portion of the first tokenizing algorithm to generate a plurality of tokenized data terms based on the plurality of data terms; and
   sorting the plurality of tokenized data terms based on the sorting order.

4. The computer-readable storage medium of claim 3, wherein interacting with the centralized tokenizing authority comprises:
   applying a blinding algorithm to the plurality of data terms to generate a plurality of blinded data terms;
   transmitting the plurality of blinded data terms to the centralized tokenizing authority and, in response, receiving a plurality of blinded tokenized data terms from the centralized tokenizing authority; and
   applying an unblinding algorithm to the plurality of blinded tokenized data terms to generate the plurality of tokenized data terms.

5. The computer-readable storage medium of claim 4, wherein the blinding algorithm is a homomorphism with respect to the first tokenizing algorithm.

6. The computer-readable storage medium of claim 1, wherein the tokenized query term is derived from a query term using the first tokenizing algorithm or the related second tokenizing algorithm.

7. The computer-readable storage medium of claim 6, wherein the query term comprises either a domain name or an Internet Protocol address, and the query comprises either a WHOIS request or a registration data access protocol (RDAP) request.

8. The computer-readable storage medium of claim 1, wherein the first tokenizing algorithm is compliant with an NSEC5 protocol.

9. A method for querying a database, comprising:
   determining a tokenized query term based on a query term and a first tokenizing algorithm;
   transmitting a request for information to a tokenized list holder that includes the tokenized query term, wherein the tokenized list holder has access to the database and a plurality of tokenized data terms that are associated with the database; and
   receiving a signed response from the tokenized list holder that specifies a gap in the plurality of tokenized data terms where the tokenized query term should be listed based on a predetermined sort order.

10. The method of claim 9, further comprising verifying a digital signature associated with the signed response.

11. The method of claim 9, wherein the plurality of tokenized data terms are derived from the database using the first tokenizing algorithm or a related second tokenizing algorithm.

12. The method of claim 9, wherein determining the tokenized query term comprises transmitting the query term to a centralized tokenizing authority that implements the first tokenizing algorithm and, in response, receiving the tokenized query term from the centralized tokenizing authority.

13. The method of claim 9, wherein the query term comprises either a domain name or an Internet Protocol (IP) address.

14. The method of claim 9, wherein the query comprises a WHOIS request or a registration data access protocol (RDAP) request.

15. The method of claim 9, wherein the tokenized list holder comprises a name server.

16. The method of claim 9, wherein determining the tokenized query term comprises:
   applying a blinding function to the query term to generate a blinded query term;
   transmitting the blinded query term to a centralized tokenizing authority that implements at least a portion of the first tokenizing algorithm and, in response, receiving one or more blinded responses from the centralized tokenizing authority; and
   generating the tokenized query term based on the one or more blinded responses.

* * * * *